US008855802B2

(12) United States Patent
Kawaguchi et al.

(10) Patent No.: US 8,855,802 B2
(45) Date of Patent: Oct. 7, 2014

(54) CUTTING APPARATUS, CUTTING DATA PROCESSING DEVICE AND CUTTING CONTROL PROGRAM THEREFOR

(75) Inventors: Yasuhiko Kawaguchi, Nagoya (JP); Masahiko Nagai, Nagoya (JP); Tomoyasu Niizeki, Ichinomiya (JP); Yoshinori Nakamura, Toyohashi (JP); Katsuhisa Hasegawa, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 438 days.

(21) Appl. No.: 13/431,316

(22) Filed: Mar. 27, 2012

(65) Prior Publication Data

US 2012/0253504 A1 Oct. 4, 2012

(30) Foreign Application Priority Data

Mar. 30, 2011 (JP) ................................ 2011-075582
Jul. 5, 2011 (JP) ................................ 2011-149129

(51) Int. Cl.
*G06F 19/00* (2011.01)

(52) U.S. Cl.
USPC .................................... 700/159; 83/26; 83/56

(58) Field of Classification Search
USPC ........ 83/26.8, 368, 37, 88, 56, 76.1; 400/621; 101/226; 700/159, 117, 125, 259, 187
See application file for complete search history.

(56) References Cited

U.S. PATENT DOCUMENTS

| | | | | |
|---|---|---|---|---|
| 3,805,645 A * | 4/1974 | Jenny | ................................ | 81/476 |
| 4,608,891 A * | 9/1986 | Frisby et al. | ....................... | 83/56 |
| 5,124,911 A * | 6/1992 | Sack | ............................ | 705/7.32 |
| 2003/0047045 A1* | 3/2003 | Alsten et al. | ....................... | 83/13 |
| 2005/0186010 A1 | 8/2005 | Shibata et al. | | |
| 2006/0037455 A1* | 2/2006 | Deng et al. | ....................... | 83/651 |
| 2006/0042419 A1* | 3/2006 | Deng et al. | ................... | 76/107.1 |

FOREIGN PATENT DOCUMENTS

| | | |
|---|---|---|
| JP | S63-131171 A | 6/1988 |
| JP | 2005205541 A | 8/2005 |
| JP | 2007084160 A | 4/2007 |

* cited by examiner

*Primary Examiner* — Kidest Bahta
(74) *Attorney, Agent, or Firm* — Fox Rothschild LLP

(57) ABSTRACT

A cutting apparatus is disclosed in which a cutting blade and an object to be cut are moved relative to each other so that a desired pattern is cutout of the object. The cutting apparatus includes an arranging unit arranging the pattern in a cut-allowable region of the object, a frame setting unit setting a minimum boundary frame which is polygonal or curved in shape and includes a contour of the pattern arranged by the arranging unit, and a cutting data generating unit generating outer line cutting data for cutting an outer line dividing a first region near the pattern within the cut-allowable region and a second region other than the first region, outside the boundary frame, based on the boundary frame. The pattern and the outer line are cut out of the object based on pattern cutting data for cutting the pattern and the outer line cutting data.

20 Claims, 28 Drawing Sheets

FULL COVERAGE DATA

<table>
<tr><td colspan="2">NUMBER OF PATTERNS</td></tr>
<tr><td>PATTERN A</td><td>FIRST COORDINATE DATA<br>SECOND COORDINATE DATA<br>THIRD COORDINATE DATA<br><br>ELEVENTH COORDINATE DATA</td></tr>
<tr><td colspan="2">PATTERN DIVIDING DATA</td></tr>
<tr><td>PATTERN B</td><td>FIRST COORDINATE DATA<br>SECOND COORDINATE DATA<br>THIRD COORDINATE DATA<br>⋮<br>(n+1)-TH DATA</td></tr>
<tr><td colspan="2">PATTERN DIVIDING DATA</td></tr>
<tr><td>PATTERN C</td><td>FIRST COORDINATE DATA<br>SECOND COORDINATE DATA<br>THIRD COORDINATE DATA<br>FOURTH COORDINATE DATA</td></tr>
<tr><td colspan="2">PATTERN DIVIDING DATA</td></tr>
</table>

FIG. 11

WHERE —·—·—·— : BOUNDARY SELECTED WHEN D1<D2

—··—··—·· : BOUNDARY SELECTED WHEN D13D2

CUTTING APPARATUS, CUTTING DATA PROCESSING DEVICE AND CUTTING CONTROL PROGRAM THEREFOR

CROSS-REFERENCE TO RELATED APPLICATIONS

This application is based upon and claims the benefit of priority from the prior Japanese Patent Application Nos. 2011-075582 filed on Mar. 30, 2011 and 2011-149129 filed on Jul. 5, 2011, the entire contents of which are incorporated herein by reference.

BACKGROUND

1. Technical Field

The present disclosure relates to a cutting apparatus in which a cutting blade and an object to be cut are moved relative to each other so that a desired pattern is cut out of the object, a cutting data processing device which processes cutting data for the cutting apparatus and a computer-readable cutting control program on which the cutting apparatus is operable.

2. Related Art

There has conventionally been known a cutting plotter which automatically cuts a sheet such as paper, for example. The sheet is affixed to a base material serving as a holding member having an adhesive layer on a surface thereof. The cutting plotter includes a drive mechanism having rollers and a pinch roller both of which hold both ends of the base material from the vertical direction so that the object is moved in a first direction. The cutting apparatus also includes a carriage having a cutting blade which is moved in a second direction perpendicular to the first direction, whereby a desired pattern is cut out of the sheet.

The pattern having been cut out of the sheet is removed from the base material by a manual work by the user after completion of the cutting operation. In this case, the user firstly removes an unnecessary part of the sheet other than the pattern and thereafter removes the pattern. The pattern can be removed clearly without damage when the removing work is carried out in the above-described sequence. However, since the unnecessary part of the sheet is to be disposed of, the user firstly removes the unnecessary part of the sheet to dispose of the unnecessary part even when a small pattern is cut out of a much larger sheet. This results in an increase in an amount of waste sheet. Furthermore, it is troublesome to remove an entire unnecessary part of sheet.

SUMMARY

Therefore, an object of the disclosure is to provide a cutting apparatus which can reduce an unnecessary part in a postcutting object to be cut thereby to reduce waste of the object, a cutting data processing device for use with the cutting apparatus and a cutting control program on which the cutting apparatus is operable.

The present disclosure provides a cutting apparatus in which a cutting blade and an object to be cut are moved relative to each other so that a desired pattern is cut out of the object, the cutting apparatus comprising an arranging unit which arranges the pattern in a cut-allowable region of the object; a frame setting unit which sets a minimum boundary frame which is polygonal or curved in shape and includes an outline of the pattern arranged by the arranging unit; and a cutting data generating unit which generates outer line cutting data for cutting an outer line dividing a first region near the pattern within the cut-allowable region and a second region other than the first region, outside the boundary frame, based on the boundary frame, wherein the pattern and the outer line are cut out of the object based on pattern cutting data for cutting the pattern and the outer line cutting data.

BRIEF DESCRIPTION OF THE DRAWINGS

In the accompanying drawings:

FIG. 11 illustrates the structure of full coverage data including a plurality of pattern cutting data;

DETAILED DESCRIPTION

First Embodiment

Figure 1:
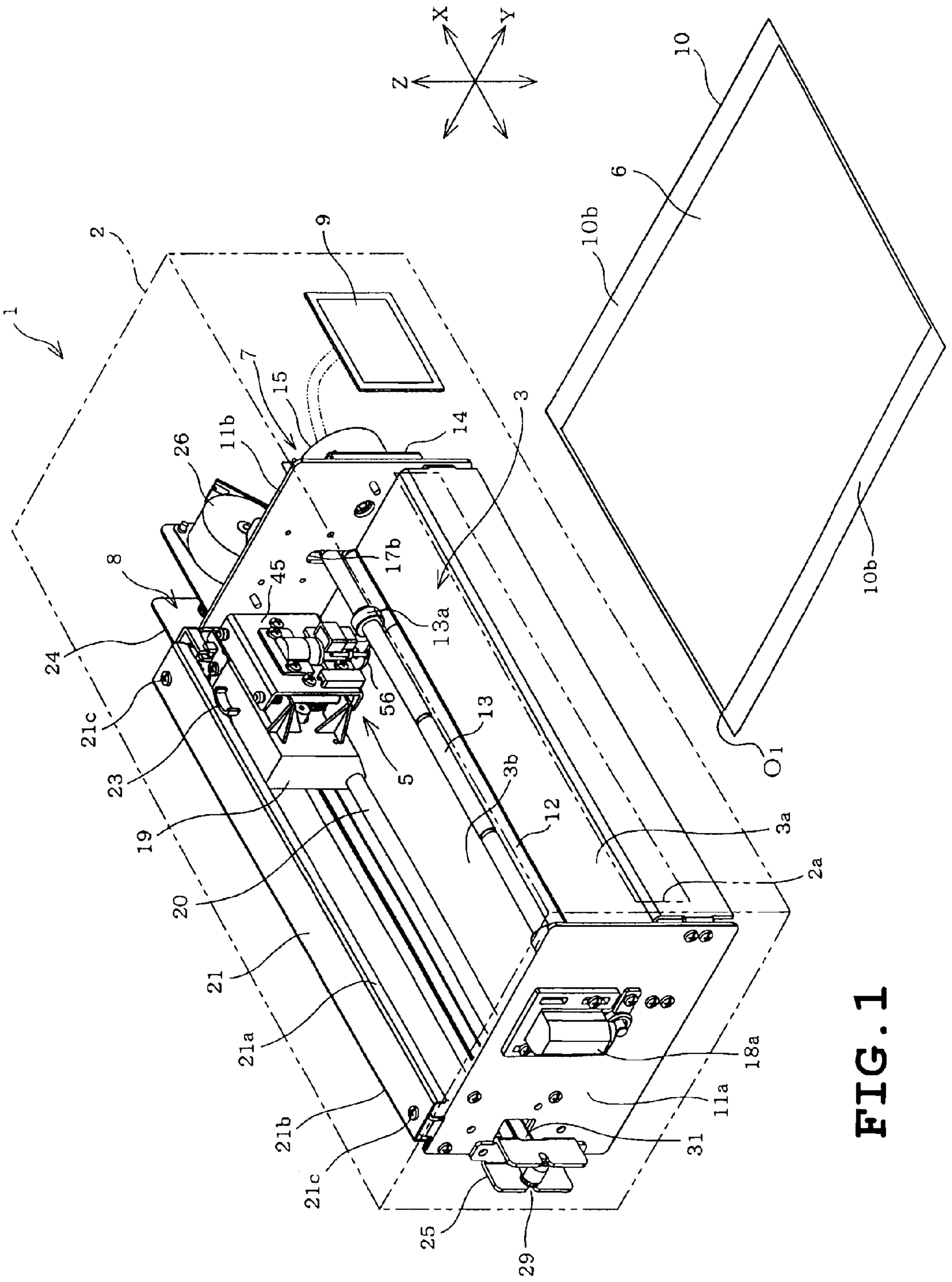
FIG. 1 is a perspective view of the cutting apparatus according to a first embodiment, showing an inner structure thereof.

A first embodiment will be described with reference to FIGS. 1 to 19B. Referring to FIG. 1, a cutting apparatus 1 includes a body cover 2 as a housing, a platen 3 provided in the body cover 2 and a cutter holder 5 also provided in the body cover 2. The cutting apparatus 1 also includes first and second moving units 7 and 8 for moving a cutter 4 (see FIG. 5) of the cutter holder 5 and an object 6 to be cut, relative to each other. The body cover 2 is formed into the shape of a horizontally long rectangular box and has a front formed with a horizontally long opening 2*a* which is provided for setting a holding sheet 10 holding the object 6. In the following description, the side where the user who operates the cutting apparatus 1 stands will be referred to as "front" and the opposite side will be referred to as "back." The front-back direction thereof will be referred to as "Y direction." The right-left direction perpendicular to the Y direction will be referred to as "X direction."

On a right part of the body cover 2 is provided a liquid crystal display (LCD) 9 which serves as a display unit displaying messages and the like necessary for the user. A plurality of operation switches 65 (see FIG. 10) is also provided on the right part of the body cover 2. The platen 3 includes a pair of front and rear plate members 3*a* and 3*b* and has an upper surface which is configured into an X-Y plane serving as a horizontal plane. The platen 3 is set so that the holding sheet 10 holding the object 6 is placed thereon. The holding sheet 10 is received by the platen 3 when the object 6 is cut. The holding sheet 10 has an upper surface with an adhesive layer 10*a* (see FIG. 8) formed by applying an adhesive agent to a part thereof except for right and left edges 10*b*. The object 6 is affixed to the adhesive layer 10*a* thereby to be held.

Figure 2:
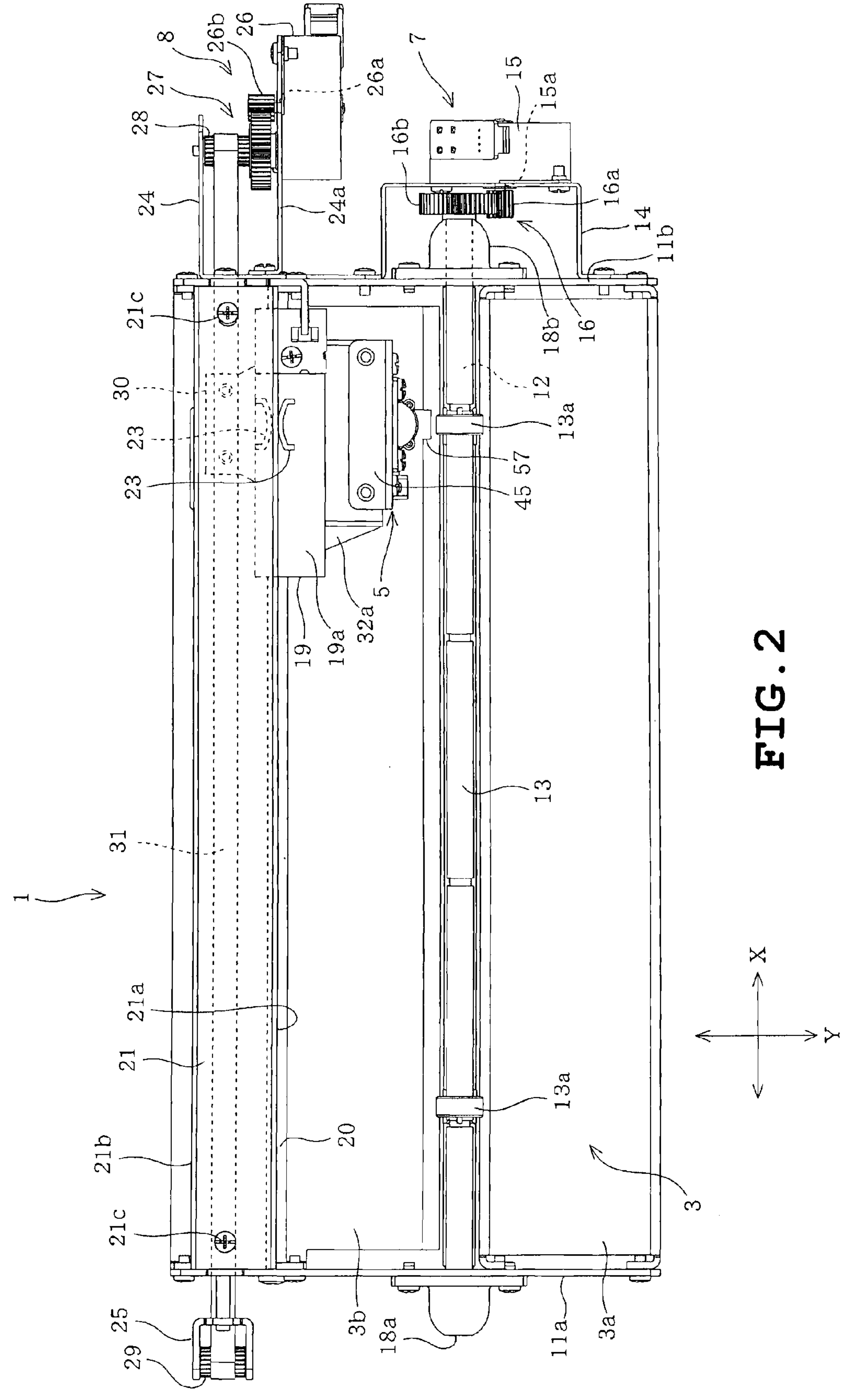
FIG. 2 is a plan view of the cutting apparatus.

The first moving unit 7 moves the holding sheet 10 on the upper surface side of the platen 3 in the Y direction (a first direction). More specifically, a driving roller 12 and a pinch roller 13 are provided on right and left sidewalls 11*b* and 11*a* so as to be located between plate members 3*a* and 3*b* of the platen 3. The driving roller 12 and the pinch roller 13 extend in the X direction and are rotatably supported on the sidewalls 11*b* and 11*a*. The driving roller 12 and the pinch roller 13 are disposed so as to be parallel to the X-Y plane and so as to be vertically arranged. The driving roller 12 is located lower than the pinch roller 13. A first crank-shaped mounting frame 14 is provided on the right sidewall 11*b* so as to be located on the right of the driving roller 12 as shown in FIG. 2. A Y-axis motor 15 is fixed to an outer surface of the mounting frame 14. The Y-axis motor 15 comprises a stepping motor, for example and has a rotating shaft 15*a* extending through the first mounting frame 14 and further has a distal end provided with a gear 16*a*. The driving roller 12 has a right end to which is secured another gear 16*b* which is brought into mesh engagement with the gear 16*a*. These gears 16*a* and 16*b* constitute a first reduction gear mechanism 16. The pinch roller 13 is guided by guide grooves 17*b* formed in the right and left sidewalls 11*b* and 11*a* so as to be movable upward and downward. Only the right guide groove 17*b* is shown in FIG. 1. Two spring accommodating members 18*a* and 18*b* are mounted on the right and left sidewalls 11*b* and 11*a* in order to cover the guide groove 17*b* from the outside respectively. The pinch roller 13 is biased downward by compression coil springs (not shown) accommodated in the spring accommodating portions 18*a* and 18*b* respectively. The pinch roller 13 is provided with pressing portions 13*a* which are brought into contact with a left edge 10*b* and a right edge 10*c* of the holding sheet 10, thereby pressing the edges 10*b* and 10*c*, respectively. Each pressing portion 13*a* has a slightly larger outer diameter than the other portion of the pinch roller 13.

The driving roller 12 and the pinch roller 13 press the holding sheet 10 from below and from above by the urging force of the compression coil springs thereby to hold the holding sheet 10 therebetween (see FIG. 9). Upon drive of the Y-axis motor 15, normal or reverse rotation of the Y-axis motor 15 is transmitted via the first reduction gear mechanism 16 to the driving roller 12, whereby the holding sheet 10 is moved backward or forward together with the object 6. The first moving unit 7 is thus constituted by the driving roller 12, the pinch roller 13, the Y-axis motor 15, the first reduction gear mechanism 16, the compression coil springs and the like.

The second moving unit 8 moves a carriage 19 supporting the cutter holder 5 in the X direction (a second direction). The second moving unit 8 will be described in more detail. A guide shaft 20 and a guide frame 21 both extending in the right-left direction are provided between the right and left sidewalls 11*b* and 11*a* so as to be located at the rear end of the cutting apparatus 1, as shown in FIGS. 1 and 2. The guide shaft 20 is disposed in parallel with the driving roller 12 and the pinch roller 13. The guide shaft 20 located right above the platen 3 extends through a lower part of the carriage 19 (a through hole 22 as will be described later). The guide frame 21 has a front edge 21*a* and a rear edge 21*b* both folded downward such that the guide frame 21 has a generally C-shaped section. The front edge 21*a* is disposed in parallel with the guide shaft 20. The guide frame 21 is adapted to guide an upper part (guided members 23 as will be described later) of the carriage 19 by the front edge 21*a*. The guide frame 21 is fixed to upper ends of the sidewalls 11*a* and 11*b* by screws 21*c* respectively.

A second mounting frame 24 is mounted on the right sidewall 11*b* in the rear of the cutting apparatus 1, and an auxiliary frame 25 is mounted on the left sidewall 11*a* in the rear of the cutting apparatus 1, as shown in FIG. 2. An X-axis motor 26 and a second reduction gear mechanism 27 are provided on the second mounting frame 24. The X-axis motor 26 comprises a stepping motor, for example and is fixed to a front of a front mounting piece 24*a*. The X-axis motor 26 includes a rotating shaft 26*a* which extends through the mounting piece 24*a* and has a distal end provided with a gear 26*b* which is brought into mesh engagement with the second reduction gear mechanism 27. A pulley 28 is rotatably mounted on the second reduction gear mechanism 27, and another pulley 29 is rotatably mounted on the left auxiliary frame 25 as viewed in FIG. 2. An endless timing belt 31 connected to a rear end (a mounting portion 30 as will be described later) of the carriage 19 extends between the pulleys 28 and 29.

Upon drive of the X-axis motor 26, normal or reverse rotation of the X-axis motor 26 is transmitted via the second reduction gear mechanism 27 and the pulley 28 to the timing belt 31, whereby the carriage 19 is moved leftward or rightward together with the cutter holder 5. Thus, the carriage 19 and the cutter holder 5 are moved in the X direction perpendicular to the Y direction in which the object 6 is conveyed. The second moving unit 8 is constituted by the above-described guide shaft 20, the guide frame 21, the X-axis motor 26, the second reduction gear mechanism 27, the pulleys 28 and 29, the timing belt 31, the carriage 19 and the like.

Figure 3:
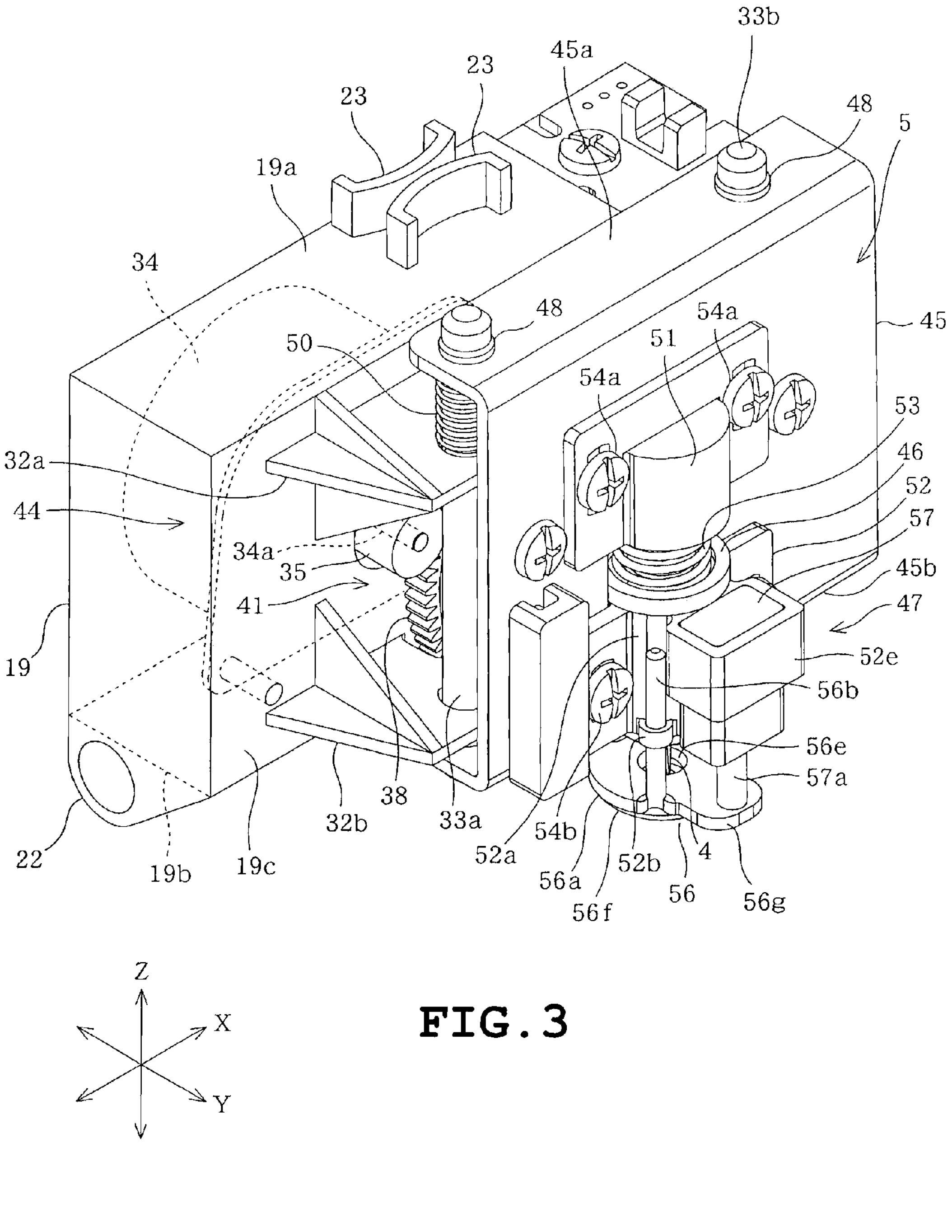
FIG. 3 is a perspective view of a cutter holder.
Figure 4:
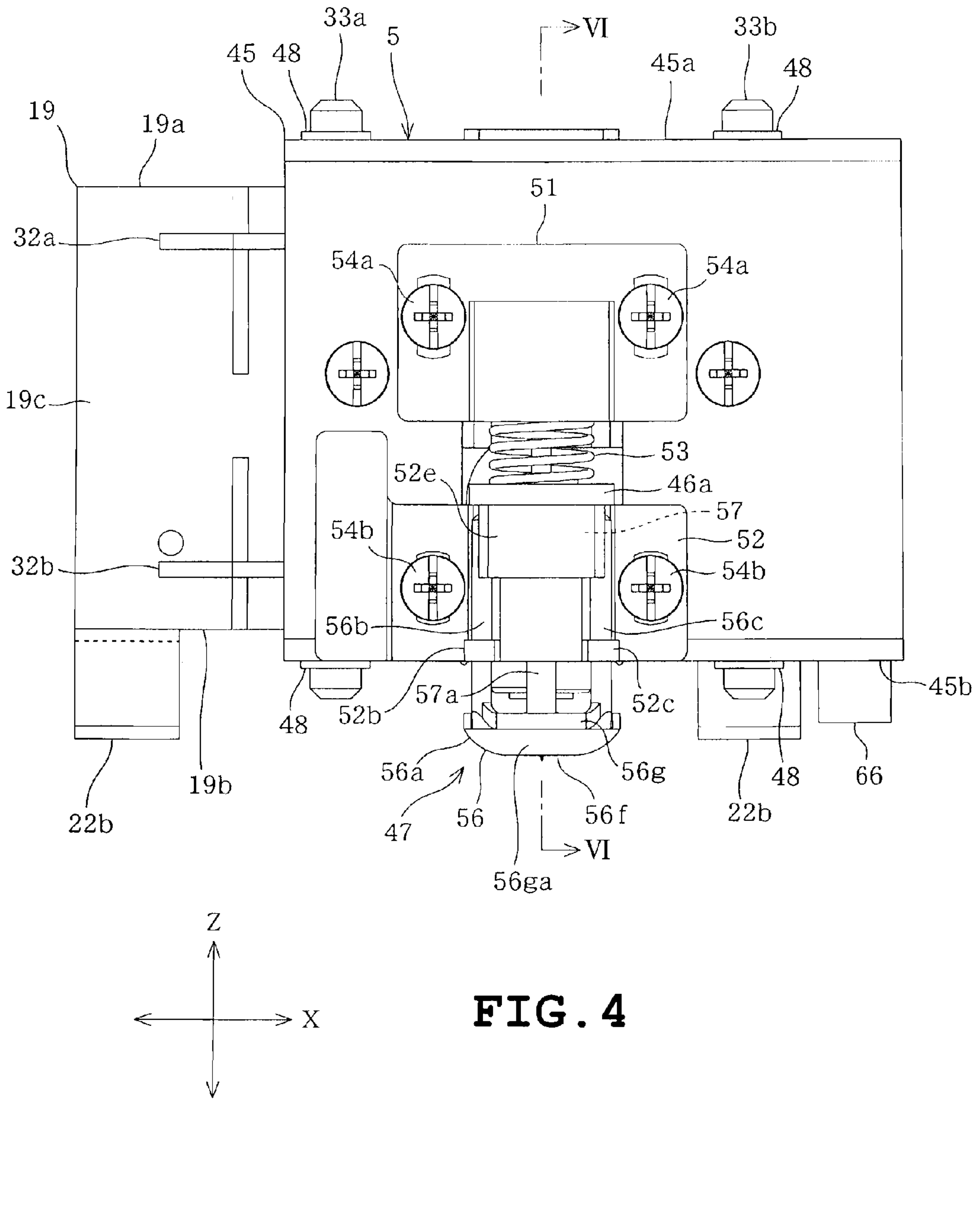
FIG. 4 is a front view of the cutter holder, showing the state where a cutter has been descended.

The cutter holder 5 is disposed on the front of the carriage 19 and is supported so as to be movable in a vertical direction (a third direction) serving as a Z direction. The carriage 19 and the cutter holder 5 will be described with reference to FIGS. 3 to 7 as well as FIGS. 1 and 2. The carriage 19 is formed into the shape of a substantially rectangular box with an open rear as shown in FIGS. 2 and 3. The carriage 19 has an upper wall 19*a* with which a pair of upwardly protruding front and rear guided members 23 are integrally formed. The guided members 23 are arc-shaped ribs as viewed in a planar view. The guided members 23 are symmetrically disposed with a front edge 21*a* of the guide frame 21 being interposed therebetween. The carriage 19 has a bottom wall 19*b* further having a downwardly expanding portion which is formed with a pair of right and left through holes 22 through which the guide shaft 20 is inserted, as shown in FIG. 4. An attaching portion 30 (see FIGS. 5 and 9) is mounted on the bottom wall 19*b* of the carriage 19 so as to protrude rearward. The attaching portion 30 is to be coupled with the timing belt 31. The carriage 19 is thus supported by the guide shaft 20 inserted through the holes 22 so as to be slidable in the right-left direction and further supported by the guide frame 21 held between the guided members 23 so as to be prevented from being rotated about the guide shaft 20.

Figure 5:
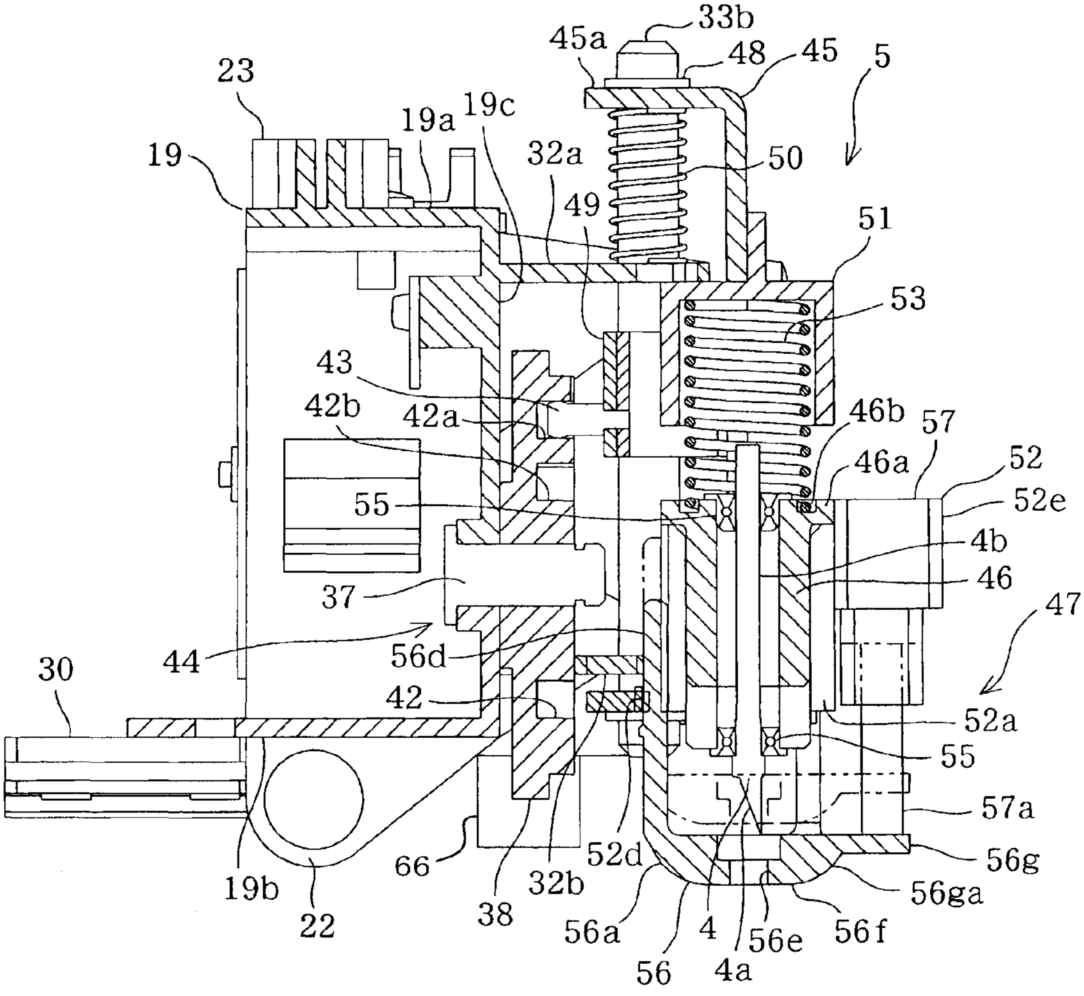
FIG. 5 is a sectional view of the cutter holder, showing the case where the cuter has been ascended.
Figure 6:
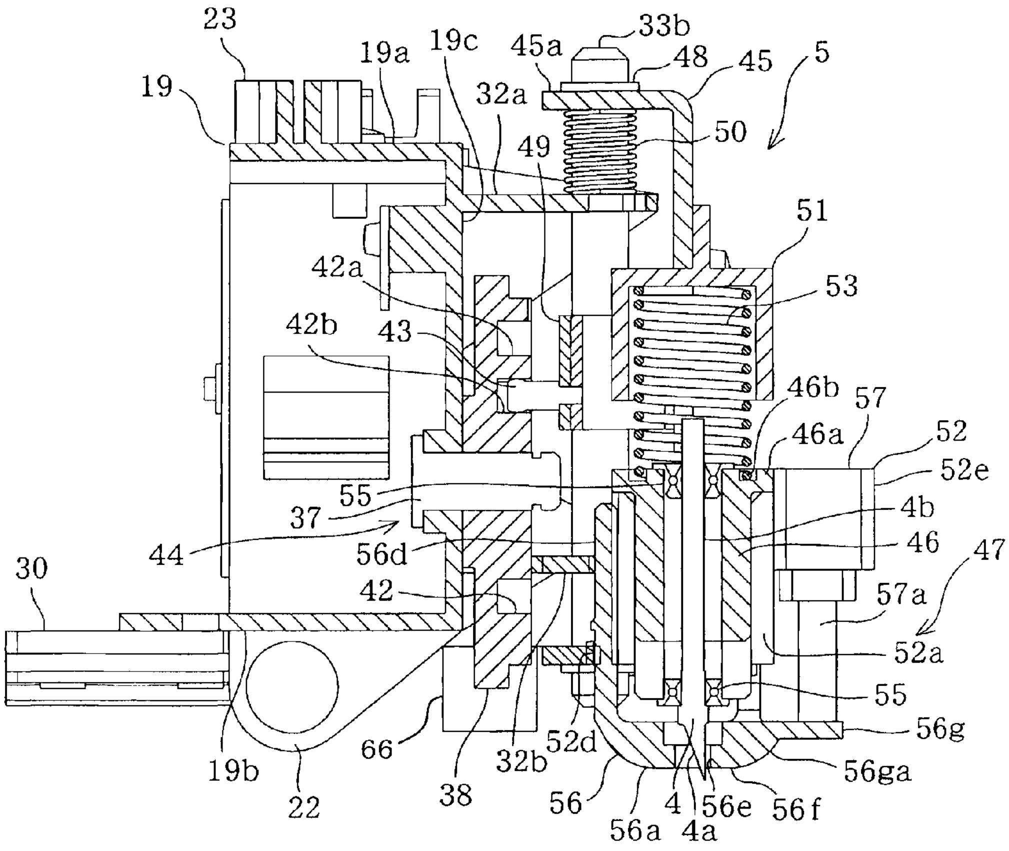
FIG. 6 is a sectional view taken along lines VI-VI in FIG. 4.
Figure 9:
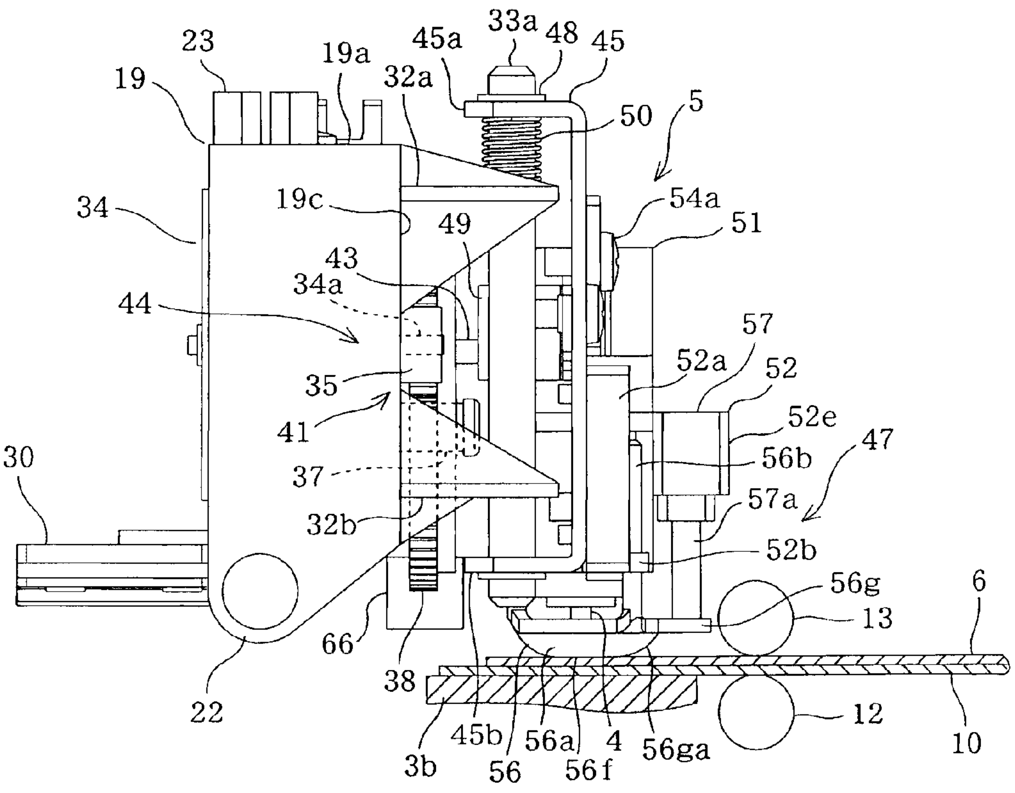
FIG. 9 is a side view of the vicinity of the cutter holder during the cutting.

The carriage 19 has a front wall 19*c* with which a pair of upper and lower support portions 32*a* and 32*b* are formed so as to extend forward as shown in FIGS. 3 to 5, 9, etc. A pair of right and left support shafts 33*b* and 33*a* extending through the respective support portions 32*a* and 32*b* are mounted on the carriage 19 so as to be vertically movable. A Z-axis motor 34 comprising, for example, a stepping motor is accommodated in the carriage 19 backward thereby to be housed therein. The Z-axis motor 34 has a rotating shaft 34*a* (see FIGS. 3 and 9) which extends through the front wall 19*c* of the carriage 19. The rotating shaft 34*a* has a distal end provided with a gear 35. Furthermore, the carriage 19 is provided with a gear shaft 37 which extends through a slightly lower part of the gear 35 relative to the central part of the front wall 19*c* as shown in FIGS. 5, 6 and 9. A gear 38 is rotatably mounted on the gear shaft 37 and adapted to be brought into mesh engagement with the gear 35 in front of the front wall 19*c* is rotatably mounted on the gear shaft 37. The gear 38 is retained by a retaining ring (not shown) mounted on a front end of the gear shaft 37. The gears 35 and 38 constitute a third reduction mechanism 41 (see FIGS. 3 and 9).

Figure 7:
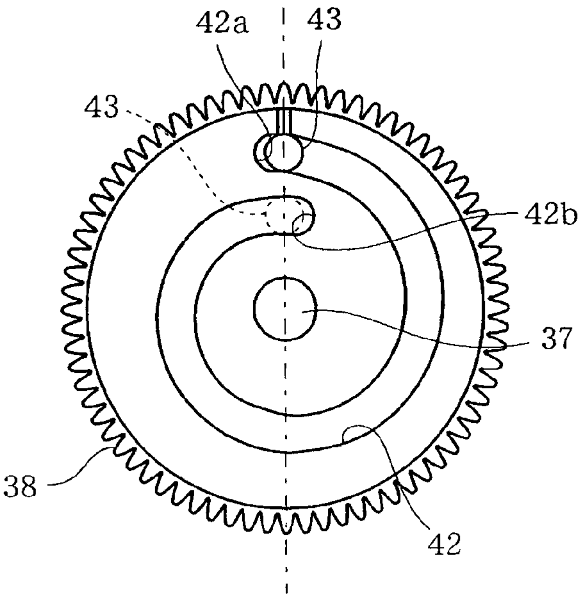
FIG. 7 is an enlarged front view of a gear.

The gear 38 is formed with a spiral groove 42 as shown in FIG. 7. The spiral groove 42 is a cam groove formed into a spiral shape such that the spiral groove 42 comes closer to the center of the gear 38 as it is turned rightward from a first end 42*a* toward a second end 42*b*. An engagement pin 43 which is vertically moved together with the cutter holder 5 engages the spiral groove 42 (see FIGS. 5 and 6) as will be described in detail later. Upon normal or reverse rotation of the Z-axis motor 34, the gear 38 is rotated via the gear 35. Rotation of the gear 38 vertically slides the engagement pin 43 in engagement with the spiral groove 42. With the vertical slide of the gear 38, the cutter holder 5 is moved upward or downward together with the support shafts 33*a* and 33*b*. In this case, the cutter holder 5 is moved between a raised position (see FIGS. 5 and 7) where the engagement pin 43 is located at the first end 42*a* of the spiral groove 42 and a lowered position (see FIGS. 6 and 7) where the engagement pin 43 is located at the second end 42*b*. A third moving unit 44 which moves the cutter holder 5 upward and downward is constituted by the above-described third reduction mechanism 41 having the spiral groove 42, the Z-axis motor 34, the engagement pin 43, the support portions 32*a* and 32*b*, the support shafts 33*a* and 33*b*, etc.

The cutter holder 5 includes a holder body 45 provided on the support shafts 33*a* and 33*b*, a movable cylindrical portion 46 which has a cutter 4 (a cutting blade) and is held by the holder body 45 so as to be vertically movable and a pressing device 47 which presses the object 6. More specifically, the holder body 45 has an upper end 45*a* and a lower end 45*b* both of which are folded rearward such that the holder body 45 is generally formed into a C-shape, as shown in FIGS. 3 to 5, 9 and the like. The upper and lower ends 45*a* and 45*b* are immovably fixed to the support shafts 33*a* and 33*b* by retaining rings 48 fixed to upper and lower ends of the support shafts 33*a* and 33*b*, respectively. The support shaft 33*b* has a middle part to which is secured a coupling member 49 provided with a rearwardly directed engagement pin 43 as shown in FIGS. 5 and 6. The holder body 45, support shafts 33*a* and 33*b*, the engagement pin 43 and the coupling member 40 are formed integrally with one another as shown in FIGS. 5 and 6. The cutter holder 5 is vertically moved by the third moving unit 44 in conjunction with the engagement pin 43. Furthermore, compression coil springs 50 serving as biasing members are mounted about the support shafts 33*a* and 33*b* so as to be located between upper surfaces of the support portion and upper end of the holder body 45, respectively. The entire cutter holder 5 is elastically biased upward by a biasing force of the compression coil springs 50 relative to the carriage 19.

Mounting members 51 and 52 provided for mounting the movable cylindrical portion 46, the pressing device 47 and the like are fixed to the middle portion of the holder body 45 by screws 54*a* and 54*b* respectively, as shown in FIGS. 3 and 4. The lower mounting member 52 is provided with a cylindrical portion 52*a* (see FIG. 5) which supports the movable cylindrical portion 46 so that the movable cylindrical portion 46 is vertically movable. The movable cylindrical portion 46 has a diameter that is set so that the movable cylindrical portion 46 is brought into a sliding contact with the inner peripheral surface of the cylindrical portion 52*a*. The movable cylindrical portion 46 has an upper end on which a flange 46*a* supported on an upper end of the cylindrical portion 52*a* is formed so as to expand radially outward. A spring shoe 46*b* is provided on an upper end of the flange 46*a*. A compression coil spring 53 is interposed between the upper mounting member 51 and the spring shoe 46*b* of the movable cylindrical portion 46 as shown in FIGS. 5 and 6. The compression coil spring 53 biases the movable cylindrical portion 46 (the cutter 4) to the lower object 6 side while allowing the upward movement of the movable cylindrical portion 46 against the biasing force when an upward force acts on the cutter 4.

Figure 8:
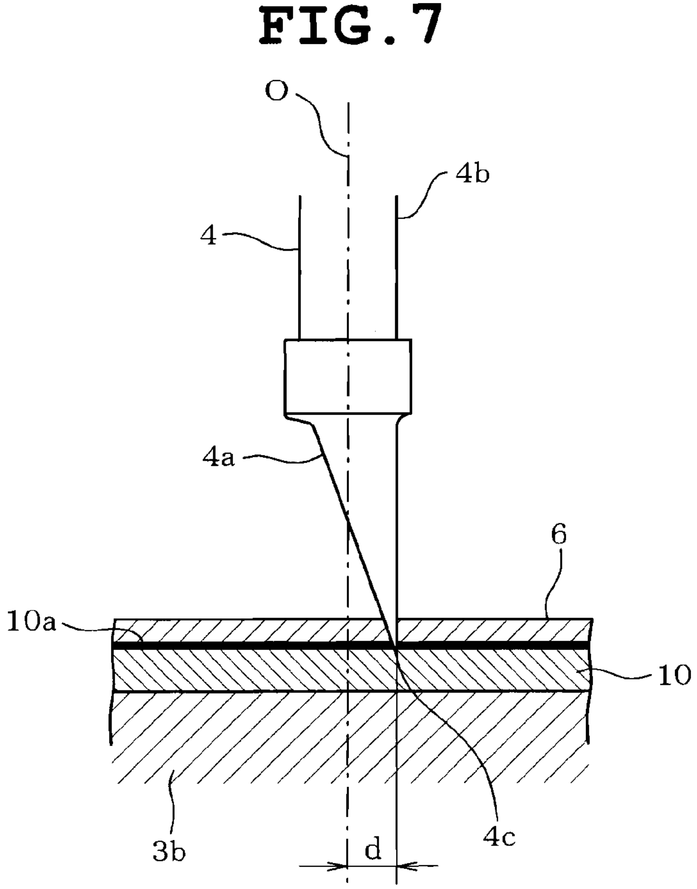
FIG. 8 is an enlarged view of the vicinity of a distal end of the cutter during the cutting.

The cutter 4 is provided in the movable cylindrical portion 46 so as to extend therethrough in the axial direction. In more detail, the cutter 4 has a round bar-like cutter shaft 4*b* which is longer than the movable cylindrical portion 46 and a blade 4*a* integrally formed on a lower end of the cutter shaft 4*b*. The blade 4*a* is formed into a substantially triangular shape and has a lowermost blade edge 4*c* formed at a location offset by a distance d from a central axis O of the cutter shaft 4*b*, as shown in FIG. 8. The cutter 4 is held by bearings 55 (see FIG. 5) mounted on upper and lower ends of the movable cylindrical portion 46 so as to be rotatably movable about the central axis 4*z* (the Z axis) in the vertical direction. Thus, the blade edge 4*c* of the cutter 4 presses an X-Y plane or the surface of the object 6 from the Z direction perpendicular to the X-Y plane. Furthermore, the cutter 4 has a height that is set so that when the cutter holder 5 has been moved to a lowered position, the blade edge 4*c* passes through the object 6 on the holding sheet 10 but does not reach the upper surface of the plate member 3*b* of the platen 3, as shown in FIG. 8. On the other hand, the blade edge 4*c* of the cutter 4 is moved upward with movement of the cutter holder 5 to the raised position, thereby being spaced from the object 6 (see FIG. 5).

Three guide holes 52*b*, 52*c* and 52*d* (see FIGS. 3 to 5 and 9) are formed at regular intervals in a circumferential edge of the lower end of the cylindrical portion 52*a*. A pressing member 56 is disposed under the cylindrical portion 52*a* and has three guide bars 56*b*, 56*c* and 56*d* which are to be inserted into the guide holes 52*b* to 52*d* respectively. The pressing member 56 includes a lower part serving as a shallow bowl-shaped pressing portion body 56*a*. The aforementioned equally-spaced guide bars 56*b* to 56*d* are formed integrally on the circumferential end of the top of the pressing portion body 56*a*. The guide bars 56*b* to 56*d* are guided by the respective guide holes 52*b* to 52*d*, so that the pressing member 56 is vertically movable. The pressing portion body 56*a* has a central part formed with a through hole 56*e* which vertically extends to cause the blade 4*a* to pass therethrough. The pressing portion body 56*a* has an underside serving as a contact portion 56*f* which is brought into contact with the object 6 while the blade 4*a* is located in the hole 56*e*. The contact portion 56*f* is formed into an annular horizontal flat surface and is brought into surface contact with the object 6. The contact portion 56*f* is made of a fluorine resin such as Teflon® so as to have a lower coefficient of friction, whereupon the contact portion 56*f* is rendered slippery relative to the object 6.

The pressing portion body 56*a* has a guide 56*g* which is formed integrally on the circumferential edge thereof so as to extend forward, as shown in FIGS. 3 to 5 and 9. The guide 56*g* is located in front of and above the contact portion 56*f* and includes an inclined surface 56*ga* inclined rearwardly downward to the contact portion 56*f* side. Consequently, when the holding sheet 10 holding the object 6 is moved rearward relative to the cutter holder 5, the object 6 is guided downward by the guide 56*g* so as not to be caught by the contact portion 56*f*.

The mounting member 52 has a front mounting portion 52*e* for the solenoid 57, integrally formed therewith. The front mounting portion 52*e* is located in front of the cylindrical portion 52*a* and above the guide 56*g*. The solenoid 57 serves as an actuator for vertically moving the pressing member 56 thereby to press the object 6 and constitutes a pressing device 47 (a pressing unit) together with the pressing member 56 and a control circuit 61 which will be described later. The solenoid 57 is mounted on the front mounting portion 52*e* so as to be directed downward. The solenoid 57 includes a plunger 57*a* having a distal end fixed to the upper surface of the guide 56*g*. When the solenoid 57 is driven with the cutter holder 5 occupying the lowered position, the pressing member 56 is moved downward together with the plunger 57*a* thereby to press the object 6 with a predetermined pressure (see FIG. 11). On the other hand, when the plunger 57*a* is located above during non-drive of the solenoid 57, the pressing member releases the object 6 from application of the pressing force. When the cutter holder 5 is moved to the raised position during non-drive of the solenoid 57 (see two-dot chain line in FIG. 5), the pressing member 56 is completely spaced from the object 6.

The holding sheet 10 has an adhesive layer 10*a* (see FIG. 8) which holds the object 6. The object 6 is immovably held on the holding sheet 10 by a resultant force of adhesion of the adhesive layer 10*a* and a pressing force of the pressing device 47. The configurations of the holding sheet 10 and the pressing device 47 will now be described with additional reference to FIGS. 8 and 9. The holding sheet 10 is made of, for example, a synthetic resin and formed into a flat rectangular plate shape, as shown in FIG. 1. The holding sheet 10 is placed opposite the cutter 4 and has a side (a side opposite the cutter 4) on which an adhesive layer 10*a* (see FIG. 8) is formed by applying an adhesive agent to the holding sheet 10. The sheet-like object 6 such as paper, cloth, resin film or the like is removably held by the adhesive layer 10*a*. The adhesive layer 10*a* has an adhesion that is set to a small value such that the object 6 can easily be removed from the adhesive layer 10*a* without breakage of the object 6.

Figure 10:
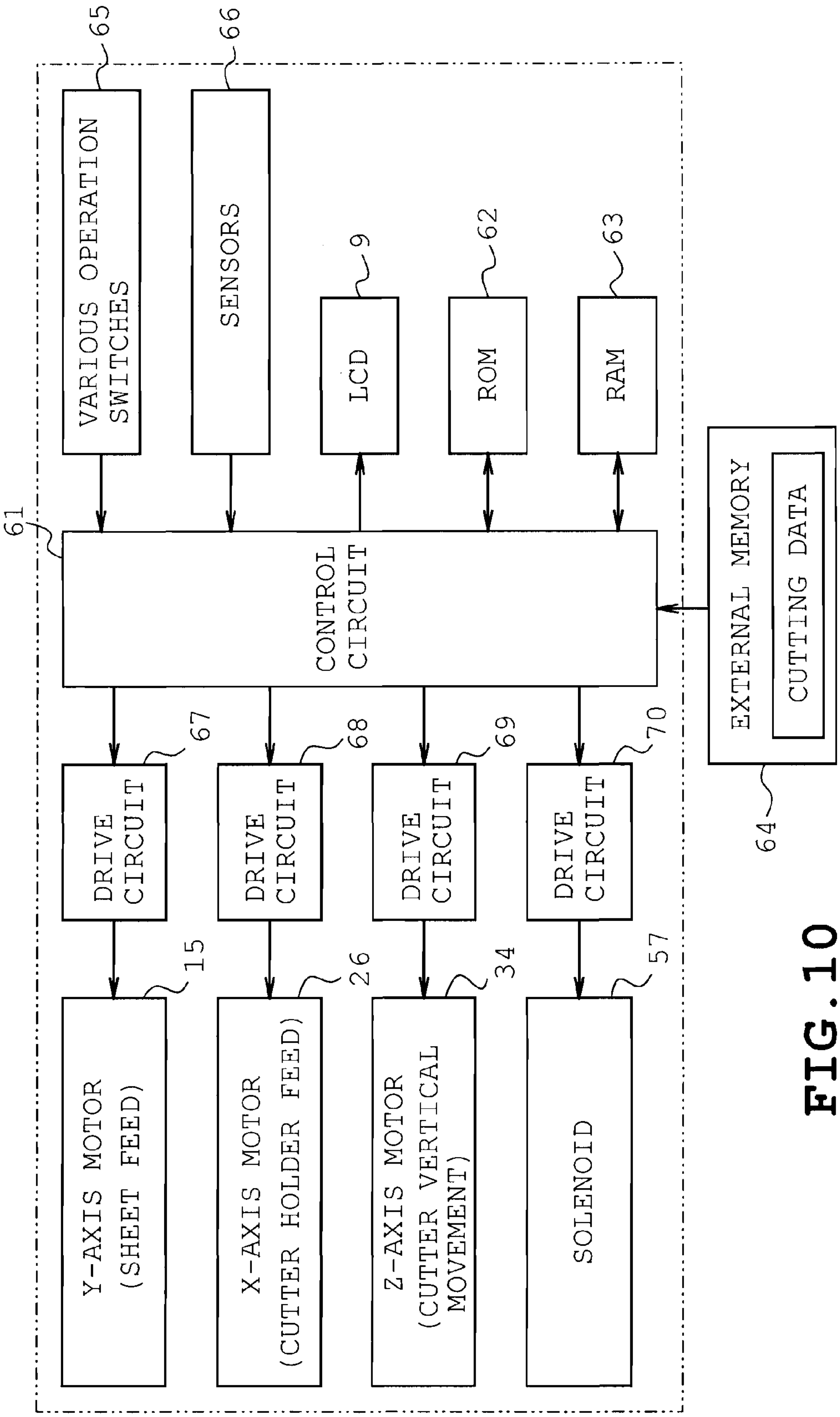
FIG. 10 is a block diagram showing an electrical arrangement of the cutting apparatus.

The arrangement of the control system of the cutting apparatus 1 will now be described with reference to a block diagram of FIG. 10. A control circuit (a control unit) 61 controlling the entire cutting apparatus 1 mainly comprises a computer (CPU). A ROM 62, a RAM 63 and an external-memory 64 each serving as a storage unit are connected to the control circuit 61. The ROM 62 stores a cutting control program for controlling the cutting operation, a cutting data processing program and the like. The RAM 63 is provided with storage areas for temporarily storing various data and program necessary for execution of each processing. The external memory 64 stores pattern cutting data for a plurality of patterns, full coverage data and region data indicative of a cut-allowable region and the like. The full coverage data and the region data will be described in detail later.

Operation signals are supplied from the various operation switches 65 to the control circuit 61. The control circuit 61 controls a displaying operation of the LCD 9. In this case, while viewing the displayed contents of the LCD 9, the user operates the switches 65 to select and designate pattern cutting data of a desired pattern. Detection signals are also supplied from various sensors 66 such as a sensor for detecting the holding sheet 10 set from the opening 2*a* of the cutting apparatus 1. To the control circuit 61 are connected drive circuits 67 to 70 driving the Y-axis, X-axis and Z-axis motors 15, 26 and 34 and the solenoid 57. Upon execution of the cutting control program, the control circuit 61 controls various actuators such as the Y-axis, X-axis and Z-axis motors 15, 26 and 34 and the solenoid 57, based on the pattern cutting data and frame cutting data as will be described later, whereby the cutting operation is automatically executed for the object 6 on the holding sheet 10.

Figure 12A:
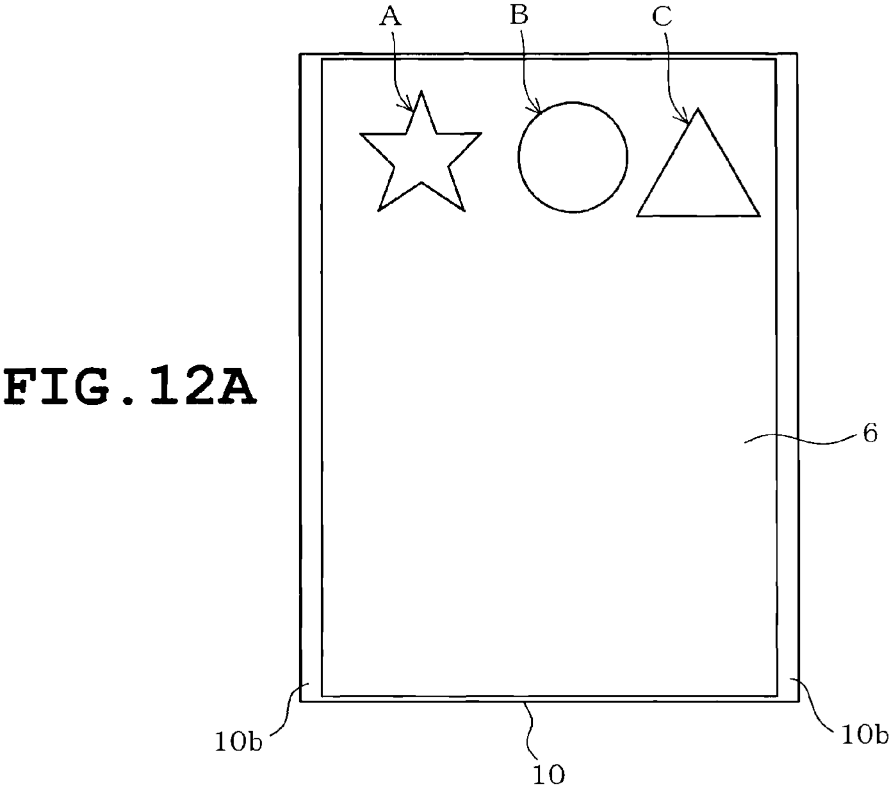
FIGS. 12A and 12B illustrate an entire view of the object held by the holding member, and the postcutting pattern and an unnecessary part respectively.

The pattern cutting data will now be described as an example in which a plurality of, for example, three patterns are cut out of the object 6 held on the holding sheet 10. Paper is used as the object 6 in the example. More specifically, a pattern A of "star," a pattern B of "circle" and a pattern C of "triangle" are to be cut out of the object 6 as shown in FIG. 12A. Full coverage data in this case includes the number of patterns indicative of information about the total number of patterns, pattern cutting data of "pattern A" to "pattern C," pattern dividing data and the like. The number of patterns is 3 and pattern cutting data of each pattern is composed of coordinate data in which apexes of a cutting line comprising a plurality of line segments are indicated by X-Y coordinates respectively.

Figure 15A:
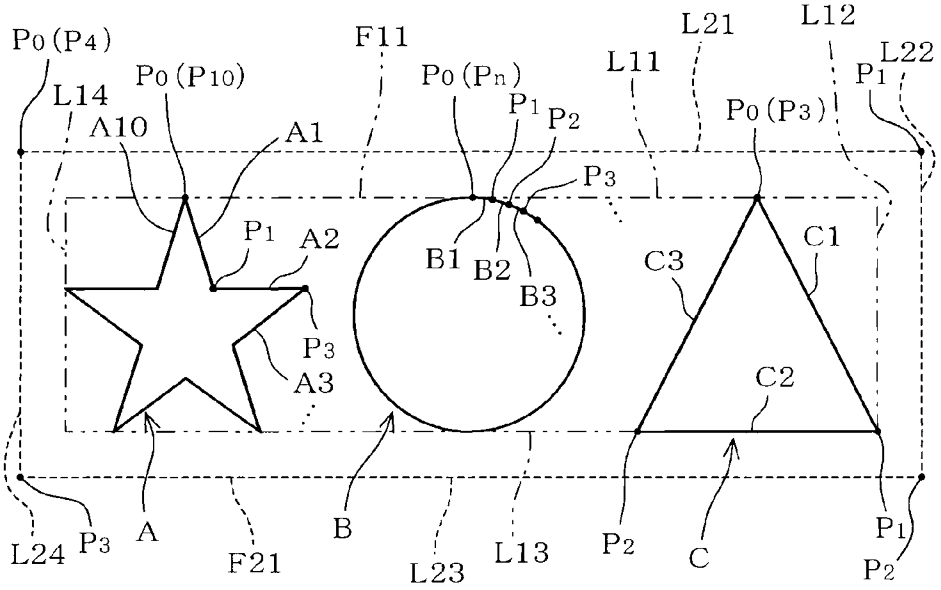
FIGS. 15A and 15B are enlarged views showing the relationship among a plurality of patterns and, a border frame and an enlarged frame.

More specifically, pattern A has a cutting line comprising line segments A1 to A10 and is indicative of a closed star shape having cutting start and end points $P_0$ and $P_{10}$ corresponding with each other, as shown in FIG. 15A. The pattern cutting data of pattern A includes first to eleventh coordinate data indicative of cutting start point $P_0$, apex $P_1$, apex $P_2$ . . . and cutting end point $P_{10}$, respectively (see FIG. 11). Pattern B has a cutting line comprising line segments B1, B2, B3 . . . connecting cutting start point $P_0$, apex $P_2$, . . . and cutting end point $P_n$ on a circumference respectively. The cutting line has a substantially circular shape formed by setting distance between neighboring apexes at a small value, and the cutting start and end points $P_0$ and $P_n$ correspond with each other. The pattern cutting data of pattern B includes first to (n+1)-th coordinate data indicative of cutting start point $P_0$, apex $P_1$, apex $P_2$ . . . and cutting end point $P_n$, respectively. Furthermore, the pattern C has a cutting line comprising three line segments C1 to C3 and is formed into a closed triangular shape having cutting start and end points $P_0$ and $P_3$ corresponding with each other. The pattern cutting data of pattern C has first to fourth coordinate data corresponding to cutting start point $P_0$, apex $P_1$, apex $P_2$ and cutting end point $P_3$ respectively.

When patterns A to C are to be cut, the cutting apparatus 1 executes a sequential cutting from pattern A in the full coverage data as shown in FIG. 11. More specifically, firstly, the holding sheet 10 (the object 6) is moved in the Y direction by the first moving unit 7, and the cutter holder 5 is moved by the second moving unit in the X direction by the second moving unit 8, so that the cutter 4 is relatively moved to the X-Y coordinates of cutting start point $P_0$ of pattern A. Subsequently, the blade edge 4*c* of the cutter 4 is caused to pass through the cutting start point $P_0$ of the object 6 by the third moving unit 44. The holding sheet 10 and the cutter 4 are then moved to the coordinates of end point $P_1$ of line segment A1 by the first and second moving units 7 and 8 relative to each other respectively, whereby the object 6 is cut along the line segment A1. In subsequent cutting of line segment A2, cutting is continuously executed with the end point $P_1$ of the previous line segment A1 serving as a cutting start point in the same manner as the line segment A1. Cutting is also executed regarding each of the line segments A2 to A10 in the same manner as described above, whereupon the pattern of star is cut out of the object 6 along the cutting line.

Regarding patterns B and C, patterns of circle and triangle are cut out of the object 6 along the respective cutting lines in the same manner as described above regarding pattern A. Furthermore, pattern delimiter data is affixed to the end of each of patterns A to C. The blade edge 4*c* of the cutter 4 is separated from the object 6 by the third moving unit 44 every time the cutting of one cutting line has been finished, based on the pattern delimiter data.

In the embodiment, an entire region of the object 6 on the holding sheet 10 or an entire object 6 is regarded as a cut-allowable region where various patterns can be cut. The external memory 64 stores region data indicative of cut-allowable regions set on the basis of the size of the sheet-like object 6. The control circuit 61 executes processing to set an origin of the X-Y coordinate using the region data, as will be described later. The control circuit 61 is configured as an arranging unit which arranges patterns A to C in the cut-allowable region on the basis of the set origin (see $O_1$ in FIGS. 1 and 12B). The cut-allowable region corresponds to the adhesive layer 10*a* from which right and left edges 10*b* are eliminated in the upper surface of the holding sheet 10. Accordingly, the cut-allowable region is suitably settable according to the size of the holding sheet 10 or the adhesive layer 10*a*.

It is now assumed that point $O_1$ refers to a left rear corner of the object 6 (or adhesive layer 10*a*) on the holding sheet 10 as shown in FIG. 1. The cutting apparatus 1 sets point $O_1$ of the holding sheet 10 fed through the opening 2*a* as an origin ($X_0$, $Y_0$), based on a detection signal of the sensor 66 and the region data. The cutter 4 and the object 6 are moved by the first and second moving units 7 and 8 relative to each other in the X-Y coordinate system with the origin $O_1$ of the holding sheet 10 serving as a reference point, based on the pattern cutting data, respectively. In the coordinate system of the cutting apparatus 1, the positive X direction refers to a left-to-right direction with respect to the holding sheet 10, and the positive Y direction refers to a back-to-front direction with respect to the holding sheet 10.

After the aforesaid three patterns A to C have been cut out of the object 6 (paper, for example) along the respective cutting lines, the user removes the patterns of "star," "circle" and "triangle" from the holding sheet 10 holding the object 6. In order that the patterns A to C may clearly be removed, an entire unnecessary part of the object 6 outside the patterns A to C is firstly removed conventionally. This removing manner is wasteful with the object 6 and renders a removing work troublesome.

Figure 12B:
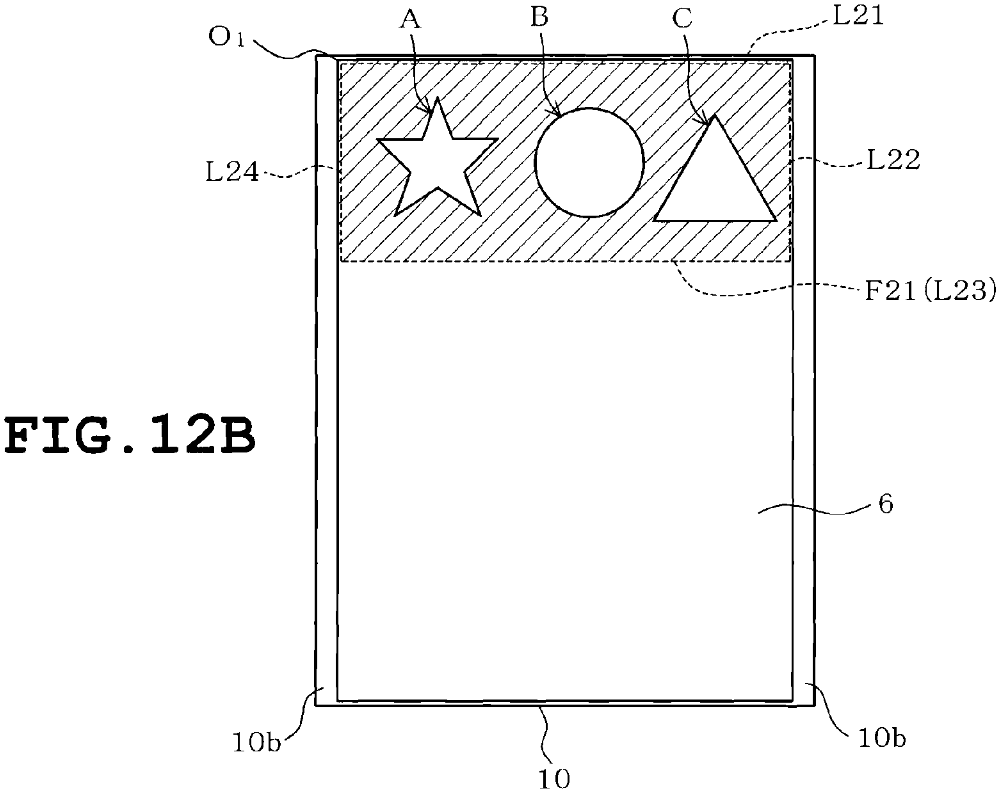
Figure 13:
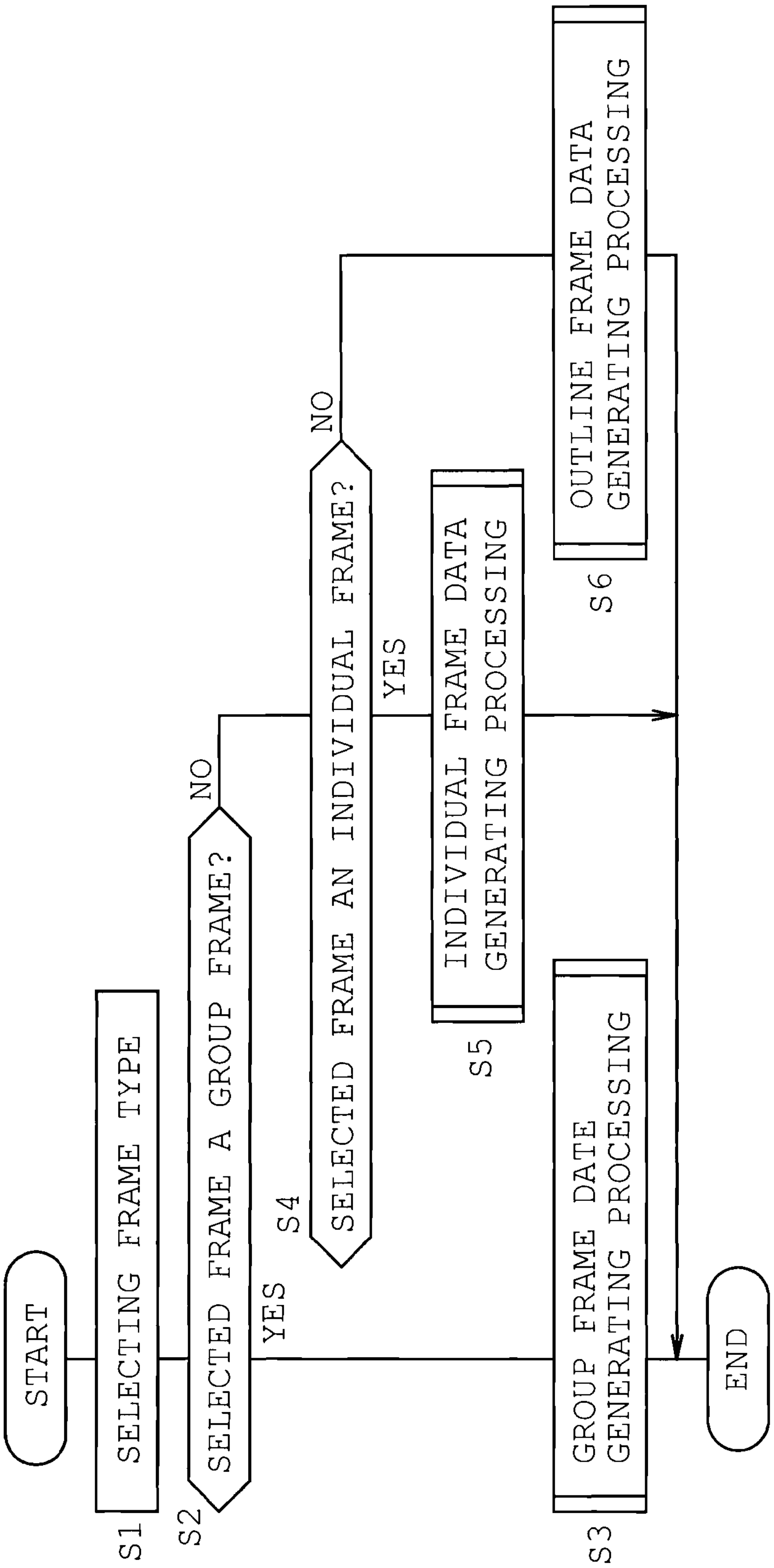
FIG. 13 is a flowchart showing the entire processing in the case where frame cutting data is generated.
Figure 14:
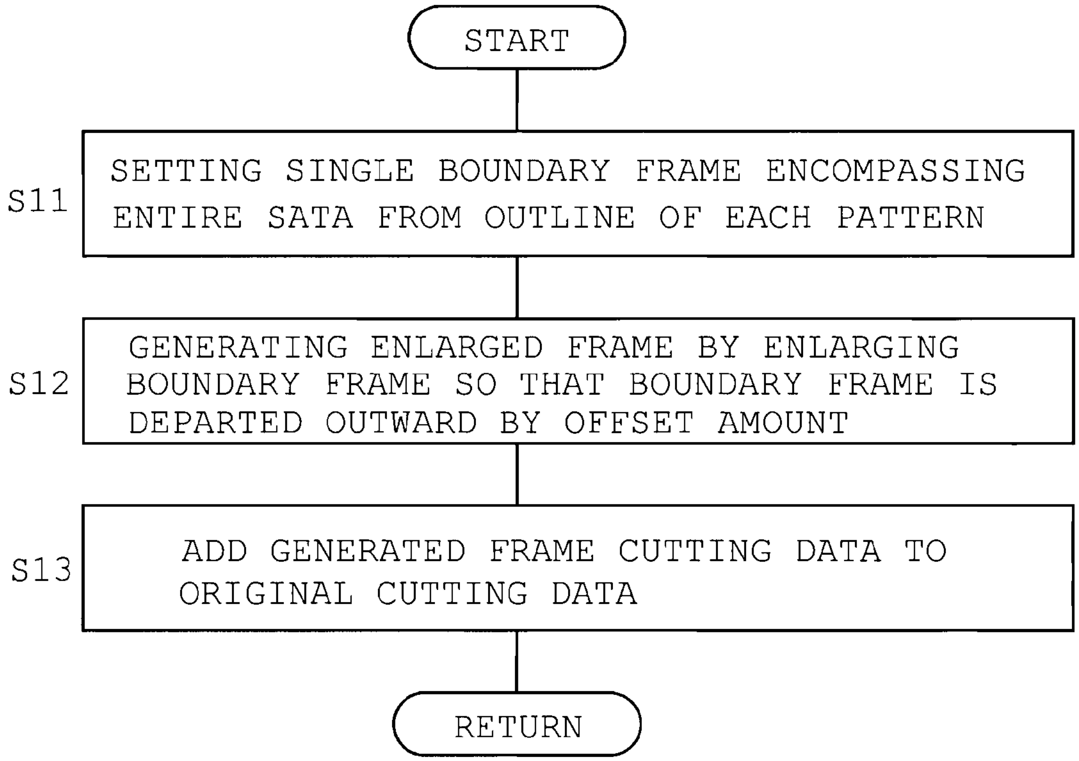
FIG. 14 is a flowchart showing the processing in the case where a single boundary frame is set for a plurality of patterns.

In view of the above-described drawback, the cutting apparatus 1 of the embodiment is provided with a software configuration (execution of the cutting control program) to generate frame cutting data to remove only a hatched region such as shown in FIG. 12B as an unnecessary part. The frame cutting data is coordinate data which indicates, by X-Y coordinate, apexes $P_0$ to $P_4$ of a frame cutting line composed of a plurality of line segments in the same manner as the pattern cutting data. The frame cutting line is set according to arrangement and outlines of the patterns.

Figure 15B:
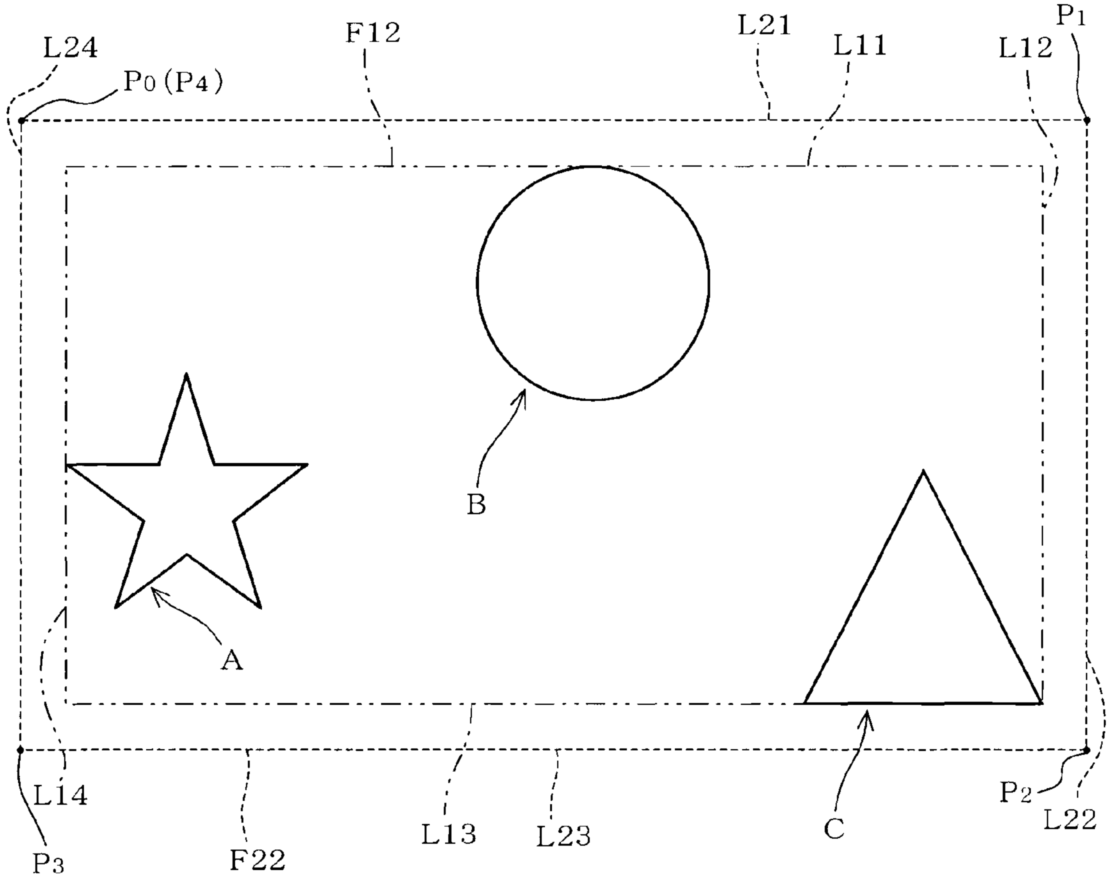

More specifically, the control circuit 61, as an arranging unit, sets a left upper corner ($P_0$ side corner) in FIG. 15A as the origin, arranging the patterns A to C on the basis of the coordinate data so that the patterns A to C correspond to the cut-allowable region. Furthermore, the control circuit 61, as an extracting unit, extracts outlines of the patterns A to C based on the full coverage data. The cutting lines of the patterns A to C correspond to the outlines respectively. The control circuit 61 then sets a minimum rectangular boundary frame F11 (see two-dot chain line in FIG. 15A) including all the outlines in the cut-allowable region, based on the extracted outlines. The boundary frame F11 is formed into the shape of a minimum rectangle that is in contact with the outlines of the patterns A to C and contains all the outlines. Apexes of the boundary are obtained from X-Y coordinates of the outlines. More specifically, when the left upper corner in FIG. 15A is set as the origin, a left end point that has a minimum X coordinate of the outlines is in contact with a line segment L14. A right end point that has a maximum X coordinate is in contact with a line segment L12. An upper end point that has a minimum Y coordinate is in contact with a line segment L14. A lower end point that has a maximum X coordinate is in contact with a line segment L13. The boundary frame F11 is thus determined by the outlines of patterns A to C. Furthermore, when the patterns A to C are arranged as shown in FIG. 15B, the boundary frame F12 has the shape of a minimum rectangle that is in contact with a part of the patterns A to C or apexes of the patterns A to C.

The boundary frame F11 is enlarged based on, for example, a previously set amount of offset so as to be spaced outward from the boundary frame F11 by a predetermined distance (corresponding to the offset amount), whereby an enlarged frame F21 is generated (see broken line in FIG. 15A). The offset amount is an amount of movement in the X and Y directions. Data of an enlarged frame F21 is generated by execution of a predetermined computation for the coordinate data of the apexes of the boundary frame F11. A numeric value or a magnification of the offset amount may directly be designated by operating the operation switches 65 by the user.

The control circuit 61 then generates frame cutting data in which the cutting start point $P_0$ and cutting end point $P_4$ correspond with each other, based on the coordinate data of apexes $P_0$ to $P_3$ of the enlarged frame F21. Thus, the control circuit 61 serves as a frame setting unit and a frame enlarging unit which sets and enlarges the boundary frame as described above and a cutting data generating unit which generates frame cutting data. The boundary frame should not be limited to a single rectangular frame encompassing all the patterns A to C as the above-described boundary frame F11. A plurality of boundary frames may be formed so as to correspond to the respective patterns A to C as will be described later in the description of working of the cutting apparatus (see FIGS. 17A and 17B). The boundary frame may be polygonal or curved instead of the rectangular shape (see FIGS. 19A and 19B). Furthermore, the enlarged frame in the embodiment corresponds to an outer line and is set so as to divide a first region near the patterns A to C and a second region outside the first region within the cut-allowable region outside the boundary frame.

The following describes a concrete processing procedure for generation of the frame cutting data before start of pattern cutting with additional reference to FIGS. 13 to 19B. FIGS. 13, 14 16, and 18 are flowcharts showing processing flows of the cutting data processing program executed by the control circuit 61. The following description exemplifies a case where a plurality of patterns is cut based on the full coverage data of FIG. 11. Firstly, when the user selects pattern cutting data of a desired pattern from the cutting data stored in the external memory 64, for example, the pattern cutting data (the full coverage data) is read from the external memory to be expanded to the memory of RAM 63. On the other hand, in starting the cutting, the control circuit 61 controls the LCD 9 so that the LCD 9 displays a region outside the patterns and inside the enlarged frame or a type of the enlarged frame to be cut as an unnecessary region. The enlarged frame includes three types, that is, "group frame," "individual frame" and "outline frame" in the embodiment. The user operates the operation switches 65 to select one type of enlarged frame (step S1). When determining that the "group frame" has been selected (YES at step S2), the control circuit 61 proceeds to step S3 for the processing to generate group frame data (see FIG. 14).

In the group frame data generating processing, the control circuit 61 arranges the patterns A to C based on the region data and the full coverage data, so that the patterns A to C correspond to the cut-allowable region. In this case, the control circuit 61 refers to the full coverage data to extract outlines of patterns A to C to be formed on the object 6. Based on X-Y coordinates of the extracted outlines, the control circuit 61 sets a minimum boundary frame F11 encompassing all the selected outlines in the cut-allowable region (step S11), whereupon the position of the boundary frame F11 is defined by the coordinate system of the cutting apparatus 1 with the left upper corner ($P_0$ side corner) in FIG. 15A serving as the origin on the basis of the region data. When the patterns A to C are arranged so as to be shifted from one another in the X and Y directions, a boundary frame F12 that becomes minimum according to the arrangement is set, as shown in FIG. 15B. Coordinates of apexes are obtained as a rectangular boundary frame encompassing all the patterns A to C from outside in either boundary frame F11 or F12.

Subsequently, the boundary frame F11 is enlarged on the basis of, for example, the set offset amount so as to be spaced outward (step S12). Thus, an enlarged frame F21 is generated as shown by broken line in FIG. 15A. Based on coordinate data of apexes of the enlarged frame F21, the control circuit 61 generates frame cutting data in which apex $P_0$ serves as a cutting start point and a cutting end point $P_4$. The control circuit 61 then writes the generated frame cutting data into the memory of RAM 63 so that the frame cutting data is added to the full coverage data (step S13), ending the processing.

Subsequently, the user affixes the object 6 (paper, for example) to the adhesive layer 10*a* so that the object 6 is held on the holding sheet 10. The user then sets the holding sheet 10 from the opening 2*a* of the cutting apparatus 1 and operates the operation switches 65 to instruct start of the cutting. As a result, the cutting of the patterns A to C is sequentially executed on the basis of the respective pattern cutting data. After end of the cutting of the pattern C, the control circuit 61 cuts the enlarged frame F21 in the order of line segments L21 to L24, based on the frame cutting data. Alternatively, the enlarged frame F21 may firstly be cut and the patterns A to C may subsequently be cut. The patterns A to C are thus cut and the enlarged frame inclusive of the patterns A to C is also cut as shown in FIGS. 12B and 15A. The user firstly removes an unnecessary part outside the patterns A to C and an unnecessary part inside the enlarged frame F21 from the holding sheet 10. Thereafter, the user removes the patterns A to C of "star," "circle" and "triangle."

On the other hand, an enlarged frame F22 is generated in the same manner as the boundary frame F11 regarding the boundary frame F12 as shown in FIG. 15B. The enlarged frame F22 is composed of line segments L21 to L24, and frame cutting data is generated on the basis of the coordinate data of the line segments L21 to L24. Accordingly, even when the patterns A to C are arranged so as to be shifted from one another in the X and Y directions, the enlarged frame F22 according to the arrangement is cut.

Figure 16:
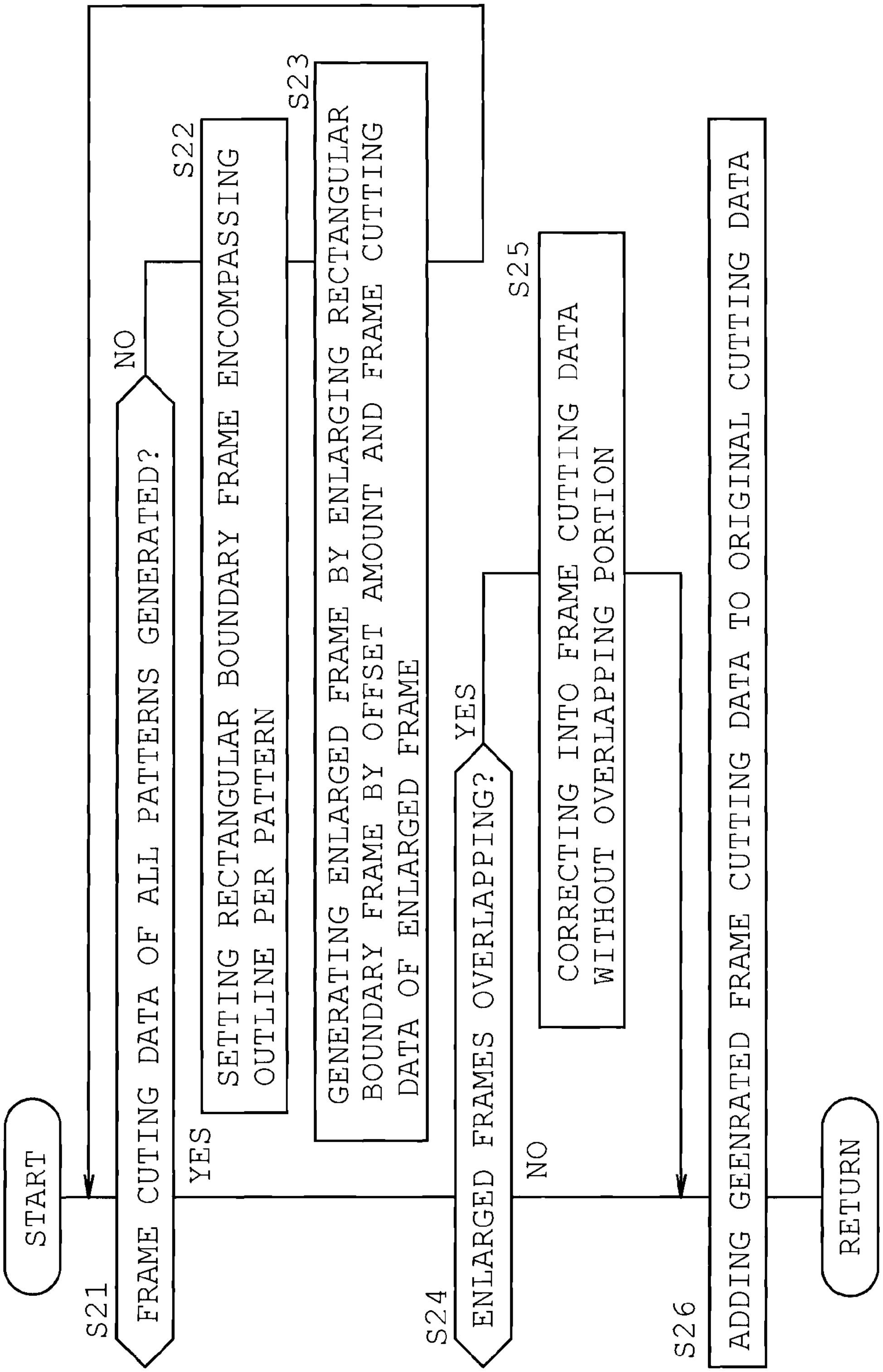
FIG. 16 is a flowchart showing the processing in the case where a boundary frame is set for every one of a plurality of patterns.

When determining at step S2 that "group frame" is not set (NO) and at step S4 that "individual frame" is set (YES), the control circuit 61 proceeds to step S5 for the processing to generate individual frame data (see FIG. 16). The individual frame data generating processing differs from the cases of the boundary frames F11 and F12 in that boundary frames F31A to F31C are set for each of the patterns A to C (see FIG. 17A). More specifically, the control circuit 61 extracts outlines, while referring to cutting data of the pattern A to be arranged in the cut-allowable region. The control circuit 61 then obtains coordinates of apexes of a boundary frame 31A (two-dot chain line FIG. 17A) which is in contact with "star" and encompassing the outline. The boundary frame F31A is generated on the basis of the X-Y coordinates of the obtained outline so that the boundary frame F31A takes the shape of minimum rectangle encompassing only the pattern A. The boundary frame F31A is enlarged so as to be spaced outward, for example, by a predetermined offset amount. As a result, an enlarged frame F41A is generated as shown by broken line in FIG. 17A. Based on coordinate data of apexes $P_0$ to $P_3$ of the enlarged frame F41A, the control device 61 generates frame cutting data with the apex. $P_0$ serving as cutting start point and cutting end point $P_4$ (step S23).

Figure 17A:
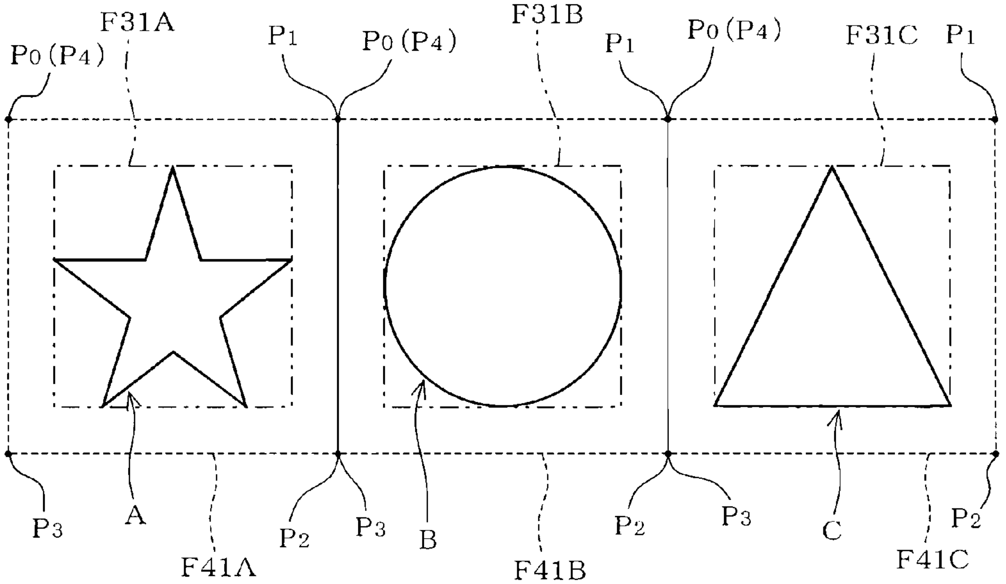
FIGS. 17A and 17B are enlarged views showing the relationship among a plurality of patterns, a boundary frame and an enlarged frame for every one of the patterns.

Since only the frame cutting data of pattern A is generated, the control circuit 61 determines in the negative (NO at step S21) and also refers to the cutting data to extract an outline regarding the pattern B in the same manner as the pattern A, thereby setting a boundary frame F31B having the shape of rectangle encompassing the outline of "circle" (step S22; see FIG. 17A). Furthermore, the control circuit 61 enlarges a boundary frame F31B based on the offset amount, thereby generating an enlarged frame F41B as shown by broken line in FIG. 17A. Based on coordinate data of apexes $P_0$ to $P_3$ of the enlarged frame F41B, the control circuit 61 generates frame cutting data with the apex $P_0$ serving as cutting start point and cutting end point $P_4$ (step S23). Regarding pattern C, the control circuit 61 also sets a boundary frame F31C having the shape of rectangle encompassing the outline of “triangle” (step S22) and enlarges the boundary frame F31C on the basis of an offset amount, generating an enlarged frame F41C. Based on coordinate data of apexes $P_0$ to $P_3$ of the enlarged frame F41B, the control circuit 61 generates frame cutting data with the apex $P_0$ serving as cutting start point and cutting end point $P_4$ (step S23).

Figure 17B:
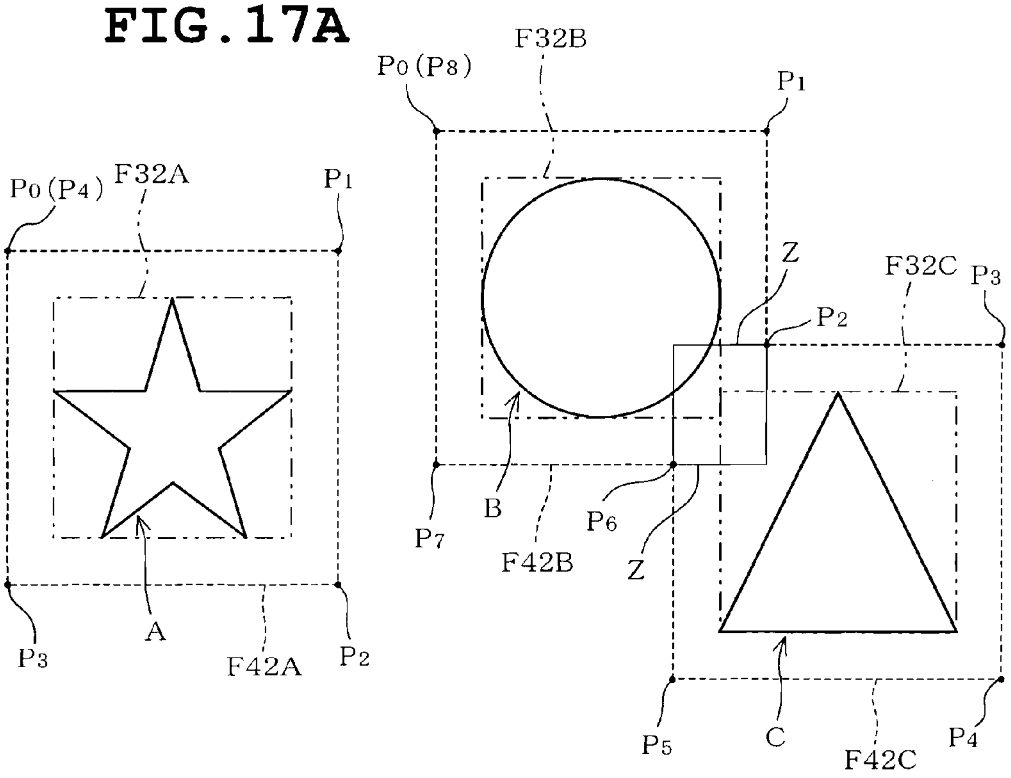

Boundary frames F32A to F32C are set for the respective patterns A to C even when the patterns A to C are arranged so as to be shifted from one another in the X and Y directions as shown in FIG. 17B. The boundary frames F32A to F32C are further enlarged on the basis of an offset amount to be set as respective enlarged frames F42A to F42C. Frame cutting data are generated with regard to the respective enlarged frames F42A to F420. When having generated the frame cutting data with respect to all the enlarged frames F41A to F41C of patterns A to C or the enlarged frames F42A to F42C (YES at step S21), the control circuit 61 proceeds to step S24 where the control circuit 61 determines whether or not any two of the enlarged frames F41A to F41C or enlarged frames F42A to F42C overlap one another.

The patterns A to C as shown in FIG. 17A are arranged at equal spaces and the enlarged frames F41A to F41C have no overlapped portions (NO at step S24). On the other hand, the patterns B and C in FIG. 17B are closely situated and the enlarged frames F42B and F42C overlap each other (YES at step S24). The control circuit 61 then executes the processing to correct the enlarged frames F42A to F42C into data without the overlapped portion (a part shown by narrow line Z in FIG. 17B) (step S25). As a result, the frame cutting data of the enlarged frames F42B and F42C is corrected into single frame cutting data in which the enlarged frames F42B and F42C are combined together with the apex $P_0$ of enlarged frame F42*b* serving as both cutting start point and cutting end point $P_8$. The control circuit 61 writes the cutting data of enlarged frame F42A and the single cutting data combining the enlarged frames F42B and F42C into the memory of the RAM 63 so that these data are added to the full coverage data (sep S26), ending the processing.

When determining at step S24 that the enlarged frames F41A to F41C have no overlapped portions (NO at step S24; see FIG. 17A), the control circuit 61 writes the frame cutting data generated at step S23 into the memory of RAM 63 so that the data is added to the full coverage data (step S26), ending the processing. Thereafter, the object 6 on the holding sheet 10 is cut by the cutting apparatus 1, based on the pattern cutting data of patterns A to C and the frame cutting data, whereby the patterns A to C and the enlarged frames F41A to F41C (or the enlarged frames F42A to F42C) can be cut. Consequently, unnecessary portions outside the respective patterns A to C in FIG. 17A and inside the respective enlarged frames F41A to F41C can be removed from the holding sheet 10. On the other hand, the overlapped portions of the enlarged frames F42B and F42C are not cut even when the patterns B and C are closely situated as in the patterns A to C in FIG. 17B, whereupon the patterns B and C are not cut.

Figure 18:
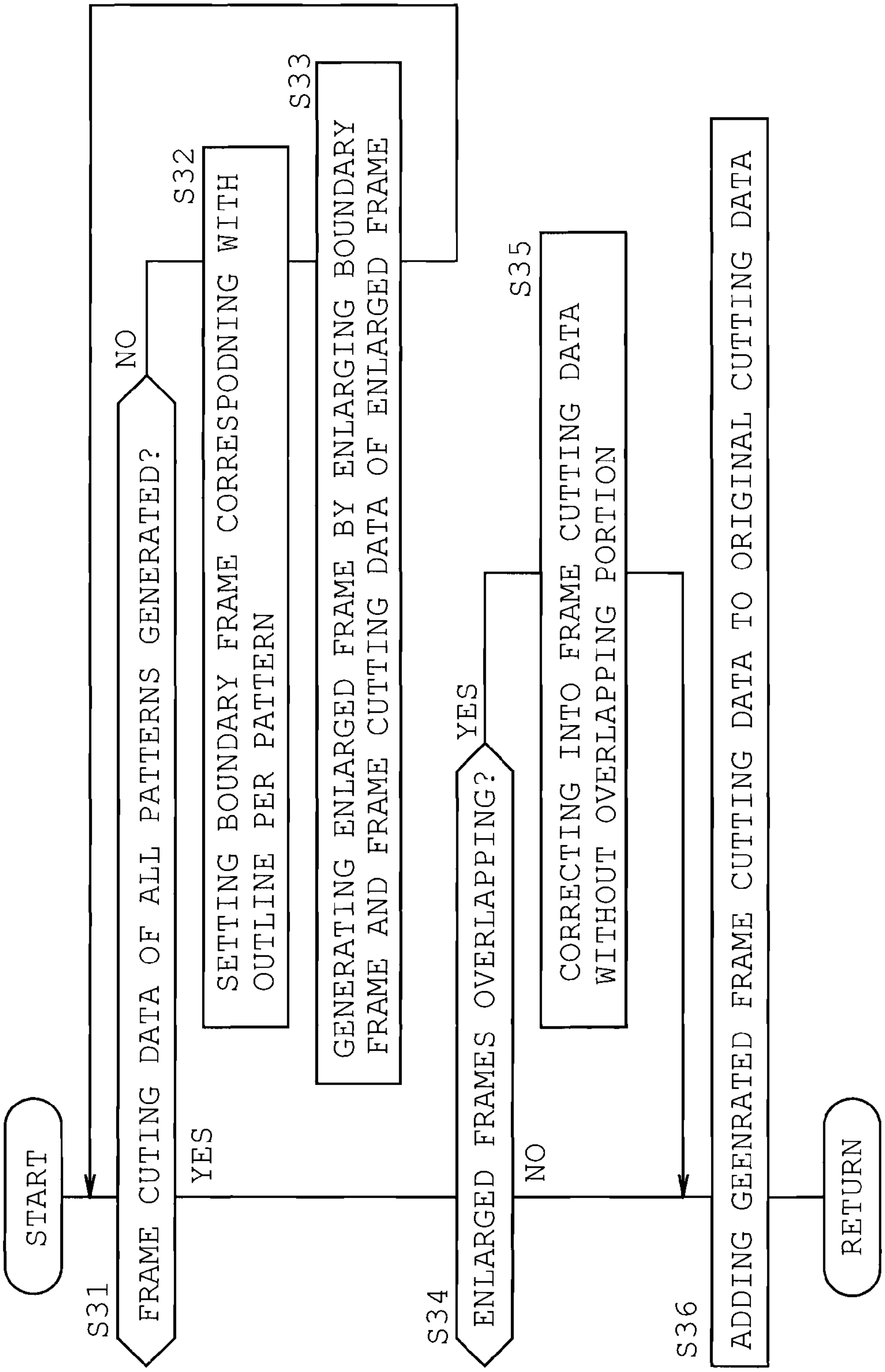
FIG. 18 is a flowchart showing the processing in the case where a boundary frame corresponding with an outline of every one of a plurality of patterns.
Figure 19A:
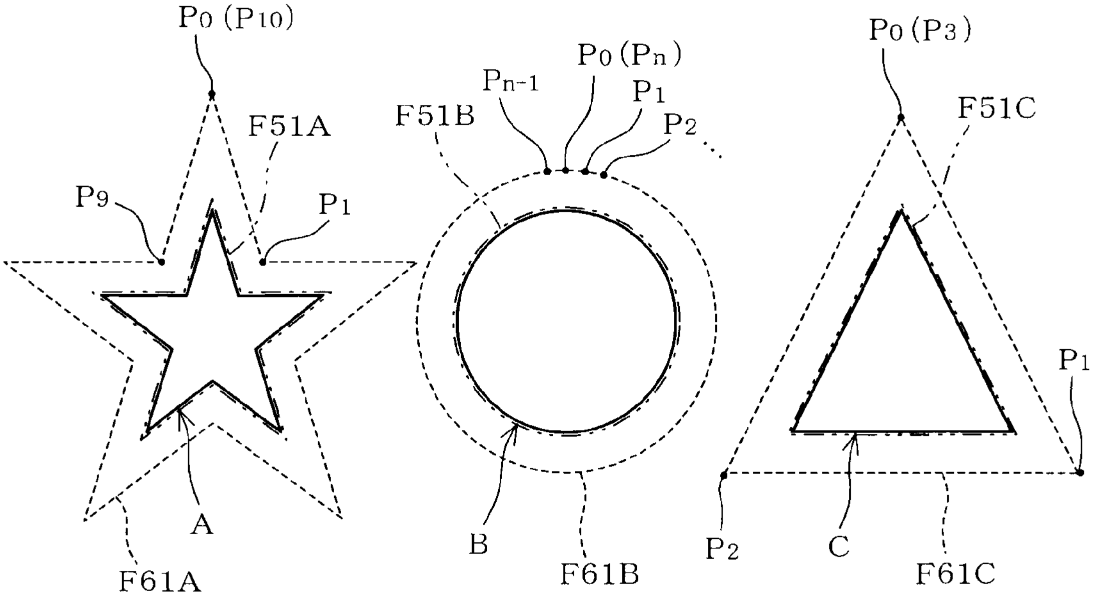
FIGS. 19A and 19B are enlarged views showing the relationship between a plurality of patterns and a boundary frame and an enlarged frame both corresponding with an outline for every pattern.

When determining at step S2 that “group frame” has not been set (NO) and at step S4 that “individual frame” has not been set (NO), the control circuit 61 proceeds to step S6 for the processing to generate outline frame data (see FIG. 18). Boundary frame F51A to F51C corresponding with respective outlines of patterns A to C are set in the outline frame data generating processing (see FIG. 19A). More specifically, at step S32 in FIG. 18, the control circuit 61 extracts an outline while referring to the cutting data of pattern A to be arranged in the cut-allowable region, setting the boundary frame F51A (two-dot chain line in FIG. 19A) having the same shape as the outline of “star.” The control circuit 61 then enlarges the boundary frame F51A based on a set offset amount so that the boundary frame F51A is spaced outward. As a result, an enlarged frame F61A as shown by broken line in FIG. 19 is generated. The control circuit 61 then generates frame cutting data with the apex $P_0$ serving as a cutting start point and a cutting end point $P_{10}$, based on coordinate data of apexes $P_0$ to $P_9$ of enlarged frame F61A (step S33).

When only the frame cutting data of pattern A has been generated (NO step at S31), the control circuit 61 extracts an outline of the pattern B while referring to the cutting data, and sets a boundary frame F51B corresponding with “circle” (step S32; and see FIG. 19A). The control circuit 61 further enlarges the boundary frame F51B based on the offset amount, generating an enlarged frame F61B as shown by broken line in FIG. 19A (step S33). The control circuit 61 then generates frame cutting data with the apex $P_0$ serving as a cutting start point and a cutting end point $P_n$, based on coordinate data of apexes $P_0$ to $P_{n-1}$ of the enlarged frame F61B. Regarding pattern C, the control circuit 61 sets a boundary frame F51C of the “triangle” shape (step S32) and enlarges the boundary frame F51C based on an offset amount, generating an enlarged frame F61C. Furthermore, the control circuit 61 generates frame cutting data with the apex $P_0$ serving as a cutting start point and a cutting end point $P_3$, based on coordinate data of apexes $P_0$ to $P_2$ of the enlarged frame F61B (step S33).

Figure 19B:
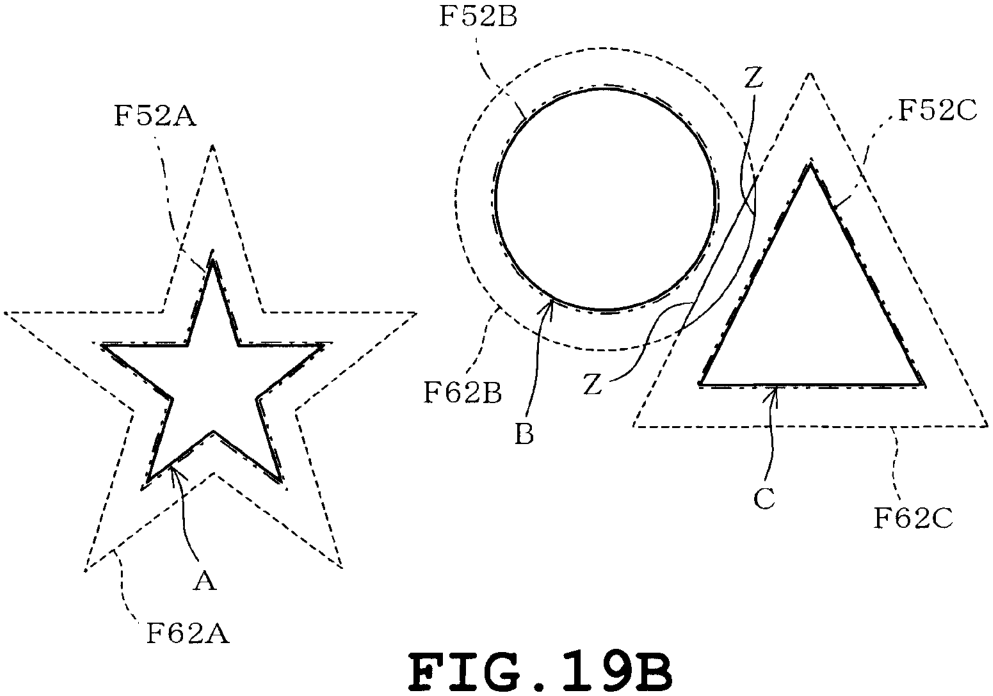

Boundary frames F52A to F52C corresponding with respective outlines of patterns A to C are set even when the patterns A to C are arranged so as to be shifted from one another in the X and Y directions as shown in FIG. 19B. The boundary frames F52A to F52C are further enlarged on the basis of an offset amount to be set as respective enlarged frames F62A to F62C. Frame cutting data are generated with regard to the respective enlarged frames F62A to F62C. When having generated the frame cutting data with respect to all the enlarged frames F61A to F61C of patterns A to C or the enlarged frames F62A to F62C (YES at step S31), the control circuit 61 proceeds to step S34 where the control circuit 61 determines whether or not any two of the enlarged frames F61A to F61C or enlarged frame F62A to F62C overlap one another.

The patterns A to C as shown in FIG. 19A are arranged at equal spaces and the enlarged frames F61A to F61C have no overlapped portions (NO at step S34). On the other hand, the patterns B and C in FIG. 19B are closely situated and the enlarged frames F62B and F62C overlap each other (YES at step S34). The control circuit 61 then executes the processing to correct the enlarged frames F62A to F62C into data without the overlapped portion (a part shown by narrow line Z in FIG. 19B) (step S35). As a result, the frame cutting data of the enlarged frames F62B and F62C is corrected into single frame cutting data in which the enlarged frames F62B and F62C are combined together with the apex $P_0$ of enlarged frame F42*b* serving as both cutting start point and cutting end point $P_n$. The control circuit 61 writes the cutting data of enlarged frame F62A and the single cutting data combining the enlarged frames F62B and F62C into the memory of the RAM 63 so that these data are added to the full coverage data (sep S36), ending the processing.

When determining at step S34 that the enlarged frames F61A to F61C have no overlapped portions (NO at step S34; see FIG. 19A), the control circuit 61 writes the frame cutting data generated at step S33 into the memory of RAM 63 so that the data is added to the full coverage data (step S36), ending the processing. Thereafter, the object 6 on the holding sheet 10 is cut by the cutting apparatus 1, based on the pattern cutting data of patterns A to C and the frame cutting data, whereby the patterns A to C and the enlarged frames F61A to F61C (or the enlarged frames F62A to F62C) can be cut. Consequently, unnecessary portions outside the respective patterns A to C in FIG. 19A and inside the respective enlarged frames F61A to F61C can be removed from the holding sheet 10. In this case, the frames F61A to F61C are similar in shape and is obtained by enlarging the outlines of the patterns A to C. Accordingly, since the region of the unnecessary portions can be rendered smaller, waste of the object can be reduced as much as possible. On the other hand, the overlapped portion of the enlarged frames F62B and F62C are not cut even when the patterns B and C are closely situated as in the patterns A to C in FIG. 19B, whereupon the patterns B and C are not cut.

During the cutting, the object 6 is pressed by the contact portion 56*f* by the drive of the solenoid 57 and held by the adhesion of the adhesive layer 10*a* of the holding sheet 10. Furthermore, the pressing member 56 is moved relative to the object 6 and the contact portion 56*f* of pressing member 56 is made of a material having a lower friction coefficient. This can reduce the frictional force generated between the contact portion 56*f* and the object 6 as much as possible. Consequently, the object 6 can be cut more reliably by preventing the object 6 from displacement due to the aforesaid frictional force, whereupon the object 6 can accurately be cut on the basis of the cutting data and the frame cutting data.

The aforementioned enlarged frames F21, F22, F41A to F41C, F42A to F42C, F61A to F61C and F62A to F62C correspond to an outer line dividing, outside the boundary frame, a first region near the pattern within the cut-allowable region and a second region other than the first region. Furthermore, the frame cutting data corresponds to outer line cutting data for cutting the outer line.

Steps S11, S22 and S32 correspond to an arranging routine of arranging the patterns A to C in the cut-allowable region of the object 6 and a frame setting routine of setting the boundary frame including the outlines of patterns A to C arranged by the arranging routine. Steps S12, S23 and S33 correspond to a cutting data generating routine of generating outer line cutting data for cutting the outer line based on the boundary frame.

The control circuit 61 thus serves as an arranging unit and a frame setting unit and sets the polygonal or curved minimum boundary frame including the outlines of the patterns A to C arranged by the arranging routine. Furthermore, the control circuit 61 serves as a cutting data generating unit and generates the outer line cutting data for cutting the outer line dividing, outside the boundary frame, the first region near the pattern within the cut-allowable region and the second region other than the first region in the cutting data generating routine, based on the boundary frame. According to the above-described configuration, the outer line can be generated which pertains to the outer line dividing the first region near the patterns A to C within the cut-allowable region and the second region other than the first region in the cutting data generating routine. Accordingly, the region outside the patterns A to C and inside the outer line or the unnecessary region is a requisite minimum according to the outlines of the patterns A to C when the object 6 is cut by the cutting apparatus 1 based on the pattern cutting data and the outer line cutting data. The entire object 6 other than the patterns is not an unnecessary portion in the embodiment. The embodiment differs from the conventional configuration in this regard. Consequently, waste of the object 6 can be reduced. Furthermore, since the unnecessary portion is a requisite minimum in the embodiment, the portion can easily be removed.

The control circuit 61 serves as an extracting unit and a frame enlarging unit and executes an extracting routine of extracting the outlines of the respective patterns A to C and a frame enlarging routine of enlarging the boundary frame set in the frame setting routine so that the boundary frame is spaced from the boundary frame by the predetermined distance (steps S12, S23, S33 and the like). According to this configuration, the polygonal or curved enlarged frame can be cut around the patterns A to C. In this case, since the region of unnecessary portion is divided from the enlarged frame according to the outlines of the patterns A to C extracted in the extracting routine, the peripheral part of the patterns A to C can reliably be removed as the unnecessary portion.

The control circuit 61 sets the boundary frame F11 (or the boundary frame F12) including all the outlines of the patterns A to C extracted in the extracting routine. The control circuit 61 enlarges the boundary frame F11 to thereby obtain the enlarged frame F21. As a result, the polygonal or curved enlarged frame can be cut around the pattern group. Accordingly, the unnecessary portion is a single connected region even when a plurality of patterns A to C are cut. Consequently, the unnecessary portion can easily be removed.

The control circuit 61 sets the boundary frames F31A to F31C (or the boundary frames F32A to F32C) for the respective patterns A to C of the pattern group and enlarges the set boundary patterns F31A to F31C, thereby obtaining the enlarged frames F41A to F41C (or the enlarged frames F42A to F42C). When any two of the enlarged frames F42A to F42C overlap, the control circuit 61 generates the frame cutting data of the part other than the overlapped portion (see FIG. 17B). According to this configuration, the region of unnecessary portion can be rendered smaller and the waste of the object 6 can be reduced as much as possible. Furthermore, when the enlarged frames F42B and F42C overlap, the regions of the unnecessary portion are connected by the overlapping portion such that the regions of unnecessary portion and the overlapping portion can be unified. Furthermore, neighboring patterns B and C can be avoided from being cut.

The control circuit 61 sets the boundary frames F51A to F51C (or boundary frames F52A to F52C) corresponding with the outlines of the respective patterns A to C of the pattern group. The control circuit 61 then enlarges the set boundary frames F51A to F51C to obtain the enlarged frames F61A to F61C (or enlarged frames F62A to F62C). When any two of the enlarged frames F62A to F62C overlap, the control circuit 61 generates frame cutting data for the portion other than the overlapping portions (see FIG. 19B). According to this configuration, since the region of unnecessary portion is similar in shape to the enlarged outline of each of patterns A to C, the region of unnecessary portion can be rendered smaller, whereby the waste of the object 6 can be reduced as much as possible. Furthermore, when the enlarged frames F62A and F62C overlap, unnecessary regions can be connected by the overlapping portion such that the regions of unnecessary portion and the overlapping portion can be unified. Additionally, neighboring patterns B and C can be avoided from being cut.

Second Embodiment

FIGS. 20 to 23 illustrate a second embodiment. Only the difference between the first and second embodiments will be described. As understood from the comparison of FIG. 21A with FIG. 15A, the sizes of the patterns A to C slightly differ from one another. However, the same reference symbols are applied to the patterns in the second embodiment as those in the first embodiment for the sake of easiness in understanding. Identical or similar parts other than the aforementioned patterns in the second embodiment are labeled by the same reference symbols as those in the first embodiment.

Figure 20:
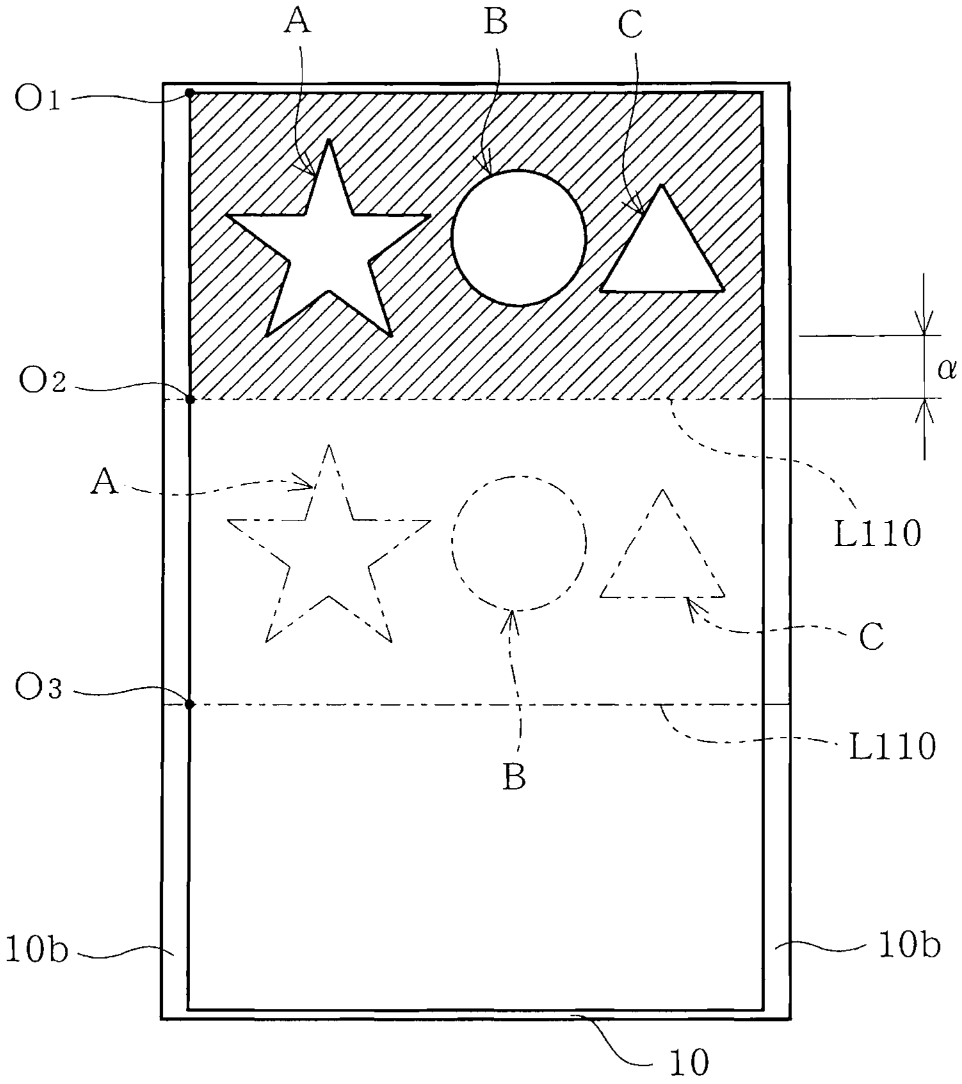
FIG. 20 is a view similar to FIG. 12B, showing the postcutting pattern and an unnecessary part together with arrangement positions of subsequent patterns in a second embodiment.

In the cutting apparatus 1 of the second embodiment, the cutting data processing program is executed to generate boundary cutting data for cutting, for example, only the region hatched in FIG. 20 as an unnecessary portion. The boundary cutting data is related to a boundary L110 that is set a predetermined distance outside a rectangular frame F110 (see FIG. 21A; and on the downside in the figure, for example) serving as the boundary frame inclusive of all the patterns A to C in the cut-allowable region. The boundary cutting data is also an X-Y coordinate data indicative of both ends of the boundary L110 and is set according to the outline of the pattern.

Figure 21A:
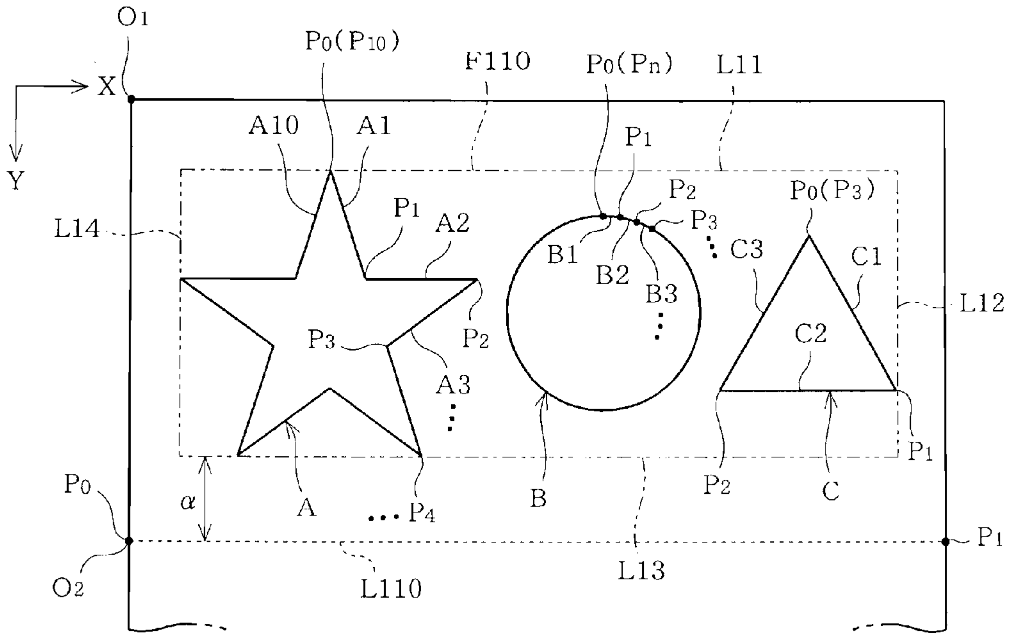
FIGS. 21A and 21B illustrates cutting data of a boundary extending in the moving direction of the cutter.

More specifically, the control circuit 61 sets, for example, the left upper corner in FIG. 21A as the origin $O_1$ based on the region data and arranges the patterns A to C according to the cut-allowable region based on the respective coordinate data. In this case, the patterns A to C aligning in the X direction are arranged so as to get nearer one side in the Y direction (upper side in FIG. 21A) by setting the corner of the cut-allowable region as the origin $O_1$. The control circuit 61 further sets a minimum rectangular frame F110 (see two-dot chain line in FIG. 21A) inclusive of all the outlines.

Figure 21B:
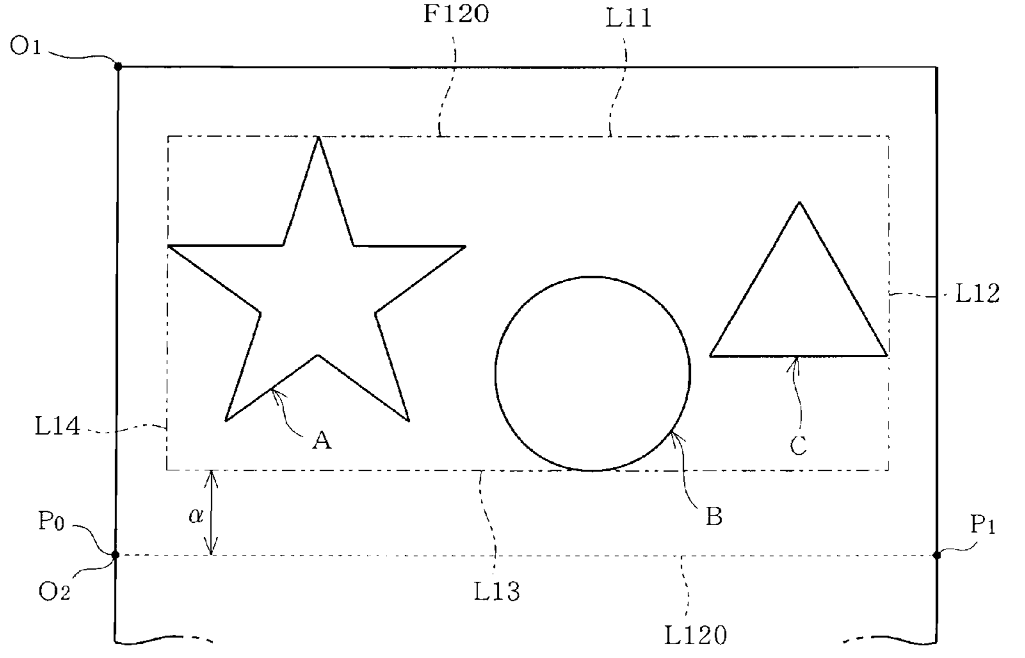

The rectangular frame F110 in the second embodiment is formed into a minimum rectangular shape inclusive of all the outlines in contact with the outlines of the respective patterns A to C in the same manner as in the first embodiment. The rectangular frame F120 becomes a minimum rectangular shape in contact with parts of the outlines of the patterns A to C or an apex even when the patterns A to C are arranged so as to be shifted from one another in the Y direction as shown in FIG. 21B.

The patterns A to C are arranged so as to be shifted to the upper side in the cut-allowable region as shown in FIG. 21A. A boundary L110 is generated so as to extend in the X direction as shown by broken line in FIG. 21A and so as to occupy a position located the predetermined distance outside the lower line segment L13 of the line segments L11 to L14 of the rectangular frame (downside by an offset amount a, for example). In this case, data of boundary L110 is generated by carrying out predetermined computation processing with respect to coordinate data of apexes at both end sides of a line segment L13 among apexes of the rectangular frame F110, for example. The control circuit 61 generates boundary cutting data to cut the boundary L110 with one of both side apexes serving as a cutting start point $P_0$ and the other apex serving as the cutting end point $P_1$. Although the aforementioned offset amount a is a predetermined value, the user may operate the operation switches 65 to directly set a numeric value, instead.

The control circuit 61 thus serves as a boundary determination unit which determines the boundary L110 dividing the cut-allowable region into a used region of the patterns A to C and an unused region other than the used region in the manner as described above. The control circuit 61 further serves as a cutting data generating unit which generates the boundary L110 as the outer line.

The RAM 63 is configured as a storage unit which stores position information of the unused region based on the region data and the boundary cutting data. For example, the position information of the unused region may include the cutting start point $P_0$ of the boundary L110 stored as corresponding to the origin $O_2$ for use in subsequent cutting operations. Accordingly, the patterns A to C are disposed with the origin $O_2$ in the subsequent cutting (see FIG. 20), whereby the patterns A to C are formed at respective positions shifted downward in the Y direction from the initial position.

Figure 22:
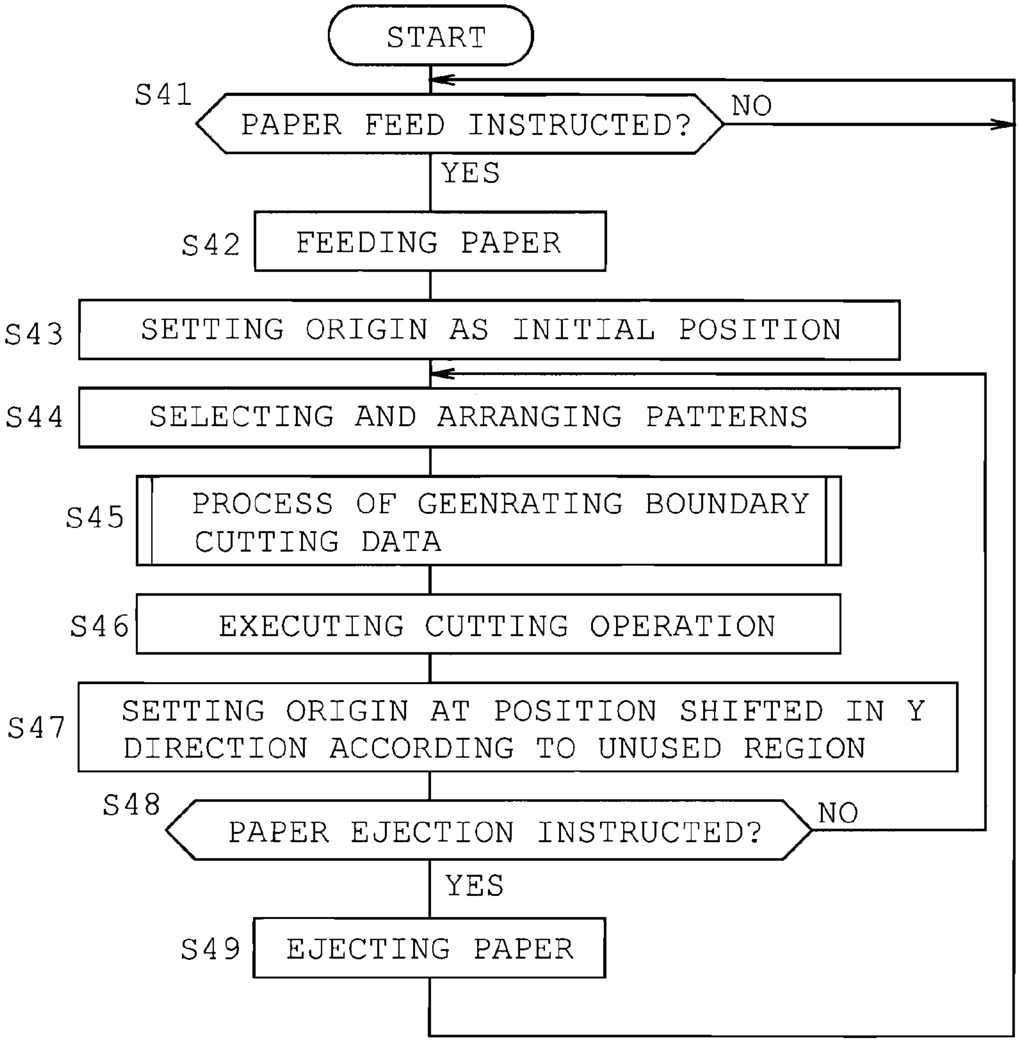
FIG. 22 is a flowchart showing the entire processing flow in the case where boundary cutting data is generated.
Figure 23:
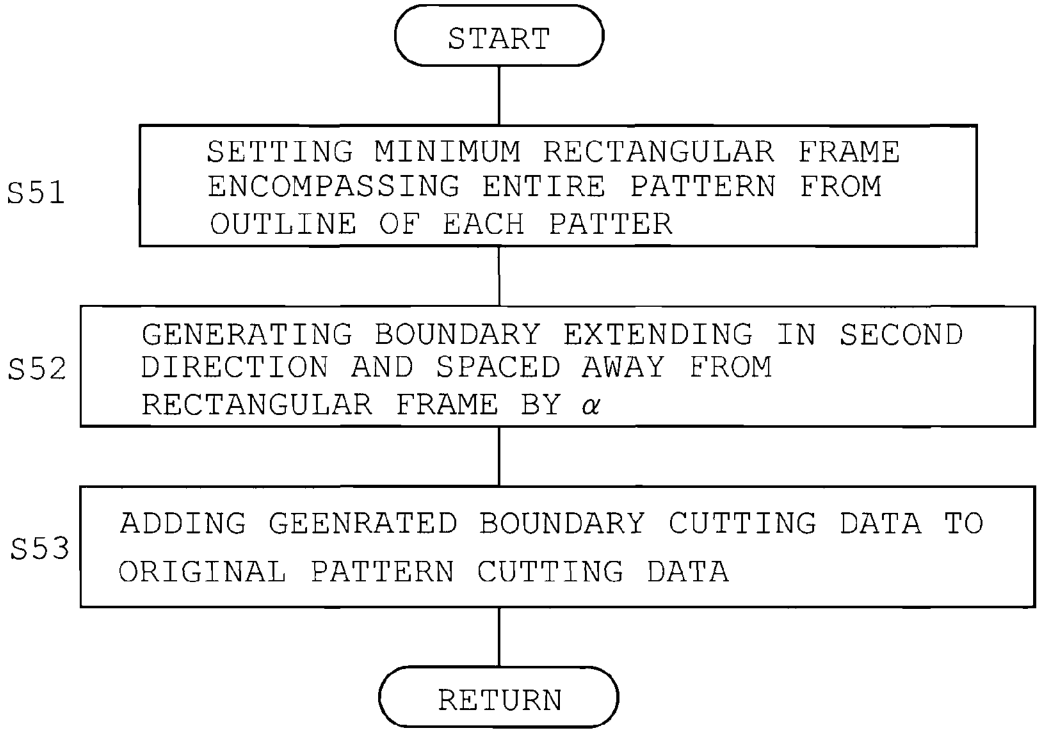
FIG. 23 is a flowchart showing the processing flow in the case where cutting data of a boundary extending in the moving direction of the cutter.

A concrete cutting processing procedure including generation of the boundary cutting data will now be described with reference to FIGS. 22 and 23. FIGS. 22 and 23 are flowcharts showing processing of the cutting data processing program executed by the control circuit 61. The following describes a case where a plurality of patterns A to C is cut on the basis of the full coverage data.

The cutting apparatus 1 starts processing of the cutting data processing program upon turn-on of the main power supply. The user sets the holding sheet 10 holding the object 6 from the opening 2*a* of the cutting apparatus 1 and then operates the operation switches 65 to instruct "paper feeding." As a result, when determining that "paper feeding" is instructed (YES at step S41), the control circuit 61 drives the first moving unit 7 to feed the holding sheet 10 backward so that the object 6 is moved to the cutting start position (step S42). In this case, the control circuit 61 reads region data from the external memory 64 to set the left upper corner in the cut-allowable region in FIG. 21A as the initial position of the origin $O_1$ of the X-Y coordinate (step S43).

Subsequently, the user selects pattern cutting data of a desired pattern from the cutting data stored in the external memory 64, for example (step S44). As a result, the pattern cutting data (the full coverage data, for example) is read from the external memory 64 to be expanded in the memory of RAM 63. The control circuit 61 further arranges the patterns A to C in the cut-allowable region with origin $O_1$, based on the coordinate data of the patterns A to C contained in the full coverage data and the region data. The control circuit 61 then proceeds to step S45 of the boundary cutting data generating processing to generate boundary cutting data regarding the patterns A to C (see FIG. 23).

In the boundary cutting data generating processing, the control circuit 61 extracts outlines of the patterns A to C disposed in the cut-allowable region. The control circuit 61 then sets a minimum rectangular frame F110 encompassing all the outlines, based on the X-Y coordinates of the extracted outlines (step S51), as shown in FIG. 21A. The control circuit 61 sets a minimum rectangular frame F120 according to the arrangement when the patterns A to C are arranged so as to be shifted from one another in the Y direction, as shown in FIG. 21B. In the case of each of rectangular frames F110 and F120, the coordinate of each apex is obtained as the minimum rectangular frame encompassing all the patterns A to C from the outside.

Subsequently, the control circuit 61 generates the boundary L110 as shown by broken line in FIG. 21A at the position spaced away downward from the line segment L13 of the rectangular frame F110, based on the predetermined offset amount a (step S52). Based on coordinates data of both ends of the boundary L110, the control circuit 61 generates boundary cutting data to cut the boundary L110 having one of both ends serving as a cutting start point $P_0$ and the other end serving as a cutting end point $P_1$. The control circuit 61 then writes the generated boundary cutting data in the memory of RAM 63 (step S53) so that the data is added to the full coverage data, returning to step S46.

The user then operates the operation switches 65 to instruct start of cutting. As a result, the control circuit 61 sequentially executes the cutting of the patterns A to C arranged with the left upper corner of the cut-allowable region serving as the origin $O_1$ of the X-Y coordinate, out of the object 6 fed at step S42 (see FIG. 20). After end of cutting of the pattern C, the control circuit 61 executes the cutting of the boundary L110 having the cutting start point set at $P_0$ and the cutting end point set at $P_1$, based on the boundary cutting data. The boundary L110 may firstly be cut and the patterns A to C may subsequently be cut.

On the other hand, the boundary frame L120 is also generated regarding the rectangular frame F120 as shown in FIG. 21B in the same manner as the rectangular frame F110. Regarding the boundary L120, too, boundary cutting data is generated on the basis of the coordinate data. Accordingly, the boundary L120 according to the arrangement of the patterns A to c is cut even when the pattern B is shifted from the other patterns A and C.

Upon end of the cutting of the patterns A to C and boundary L110, the control circuit 61 sets the origin in subsequent cutting operations at the position of $O_2$ in FIG. 21A based on the region data and the boundary cutting data (step S47). More specifically, the control circuit 61 stores as data regarding the origin position information of $O_2$ shifted in the Y direction from the initial position $O_1$. Accordingly, the user can continuously cut patterns using the unused region of the object 6 without instructing "paper ejection" after completion of the cutting (NO at step S48).

For example, assume that the user has selected patterns A to C which are the same as those cut in the previous cutting at step S4. In this case, the control circuit 61 arranges the selected patterns in the unused region (see two-dot chain line in FIG. 20). The control circuit 61 then proceeds to step S45 to execute the boundary cutting data generating processing in order to generate second boundary cutting data (see FIG. 23). The control circuit 61 extracts outlines of the patterns A to C arranged in the unused region and sets a minimum rectangular frame (not shown) encompassing all the outlines (step S51). The control circuit 61 further generates a second boundary L110 as shown in two-dot chain line in FIG. 20, at a position spaced away from the lower side of the rectangular frame (step S52). Based on coordinates data of both ends of the boundary L110, the control circuit 61 generates boundary cutting data to cut the boundary L110 having one of both ends serving as a cutting start point $P_0$ and the other end serving as a cutting end point $P_1$. The control circuit 61 then writes the generated boundary cutting data in the memory of RAM 63 (step S53) so that the data is added to the full coverage data, returning to step S46 in FIG. 22.

Upon receipt of instruction to start cutting from the user at step S46, the patterns A to C are cut out of the unused region located below the previously cut patterns A to C, with point $O_2$ serving as the origin. Furthermore, a new boundary L110 is cut on the basis of the second boundary cutting data, and the origin is updated as $O_3$ (step S47). Position information about unused region is thus updated every time the cutting is completed. Accordingly, when steps S44 to S48 are repeatedly executed, patterns can continuously be cut using the unused regions without replacement of the object 6.

On the other hand, when "paper ejection" is instructed by the operation of the operation switches 65 by the user (YES at step S48), the control circuit 61 drives the first moving unit 7 to feed the holding sheet 10 forward thereby to execute paper ejection (step S49). The user firstly removes an unnecessary portion as hatched in FIG. 20 (that is, the region of the used region outside the patterns A to C) and thereafter removes the patterns A to C of "star," "circle" and "triangle." Furthermore, when a plurality of boundaries L110 is formed on the object 6, unnecessary portions and patterns A to C can be removed for every used region, whereupon the waste of object 6 can be reduced as small as possible. The boundaries L110 and L120 in the second embodiment serve as the outer line, and the boundary cutting data serves as the outer line cutting data. The above-described step S44 serves as an arranging routine, step S51 as a frame setting routine and step S52 as a cutting data generating routine.

As understood from the foregoing, the control circuit 61 in the second embodiment serves as a boundary determining unit and executes the frame setting routine to set the rectangular frame as the boundary frame. The control circuit 61 further executes the boundary determining routine to determine the boundary which divides the cut-allowable region into the used region at the rectangular frame side and the unused region other than the used region, based on the rectangular frame. The control circuit 61 further generates the boundary cutting data in which the boundary determined by the boundary determining routine serves as the outer line (see steps S52 and S53).

According to the above-described configuration, desired patterns A to C can be cut out of the object 6, and the boundary can be cut between the used region at the patterns A-C side or rectangular frame side and the unused region. In this case, the region of the used region outside the patterns A to C or the unnecessary region is divided by the boundary set on the basis of the minimum rectangular frame encompassing the outlines of the patterns A to C. Accordingly, the unnecessary region is a requisite minimum. Consequently, the periphery of the patters A to C in the object 6 can be removed as unnecessary portion reliably and easily and thus, the second embodiment can achieve the same advantageous effects as the first embodiment.

The control circuit 61 arranges the patterns A to C in the unused region, based on the position information stored in the storage unit in subsequent cutting operations. Accordingly, even when the object 6 out of which the patterns A to C have been cut by the cutting apparatus 1 is continuously used in the subsequent cutting, patterns A to C can be arranged in the unused region of the object 6 without overlap with the previously generated patterns A to C.

The control circuit 61 arranges the patterns A to C so that the patterns A to C are shifted to one of sides in the first or Y direction in the cut-allowable region. Accordingly, the waste of the object 6 can further be reduced, whereupon the yield of the patterns can be improved. In this case, since the control circuit 61 sets the boundary so that the boundary extends in the second or X direction, the setting processing can be simplified and the cutting time can be shortened.

Third Embodiment

Figure 24:
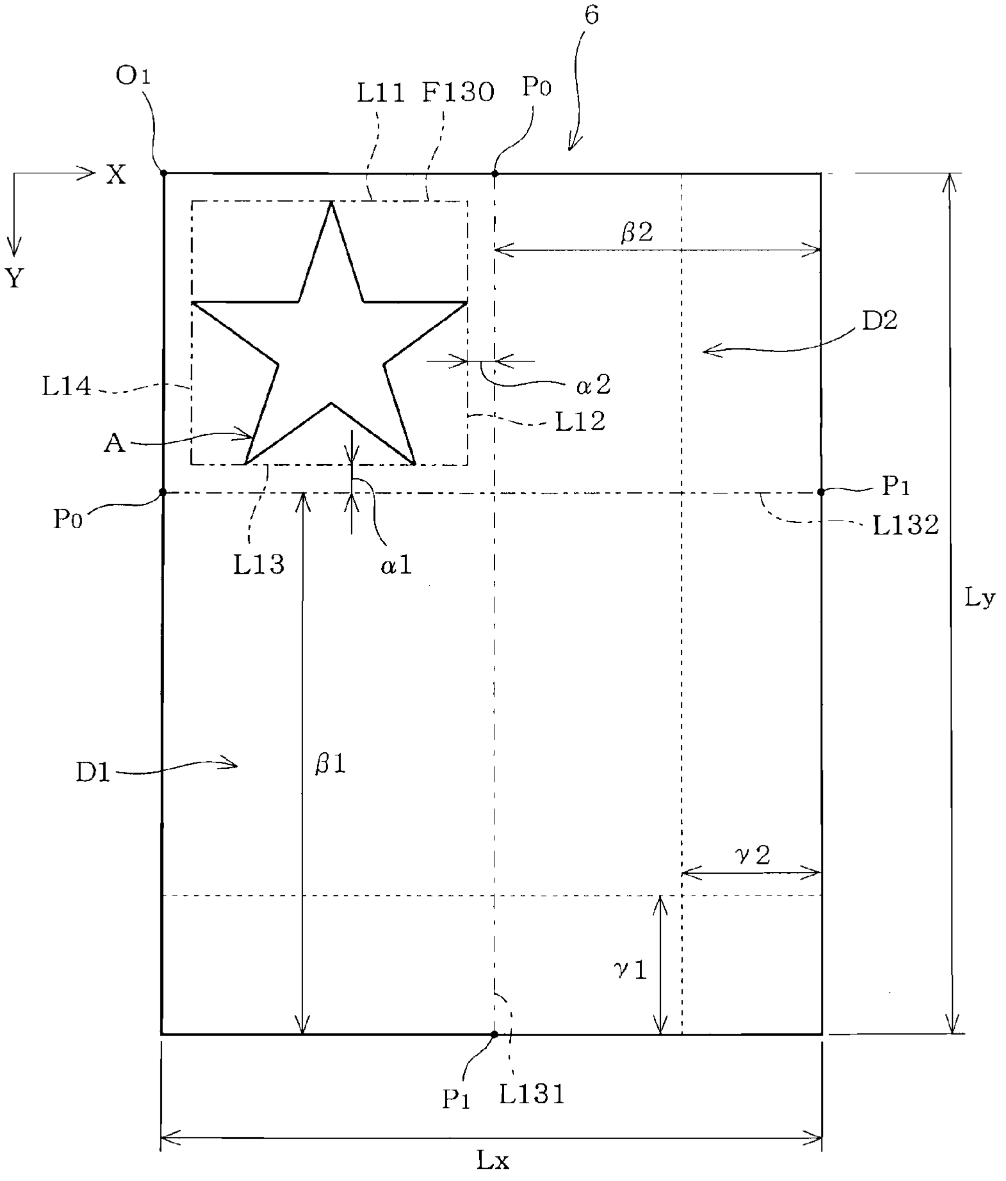
FIG. 24 illustrates cutting data of a selectively set in a third embodiment.
Figure 25:
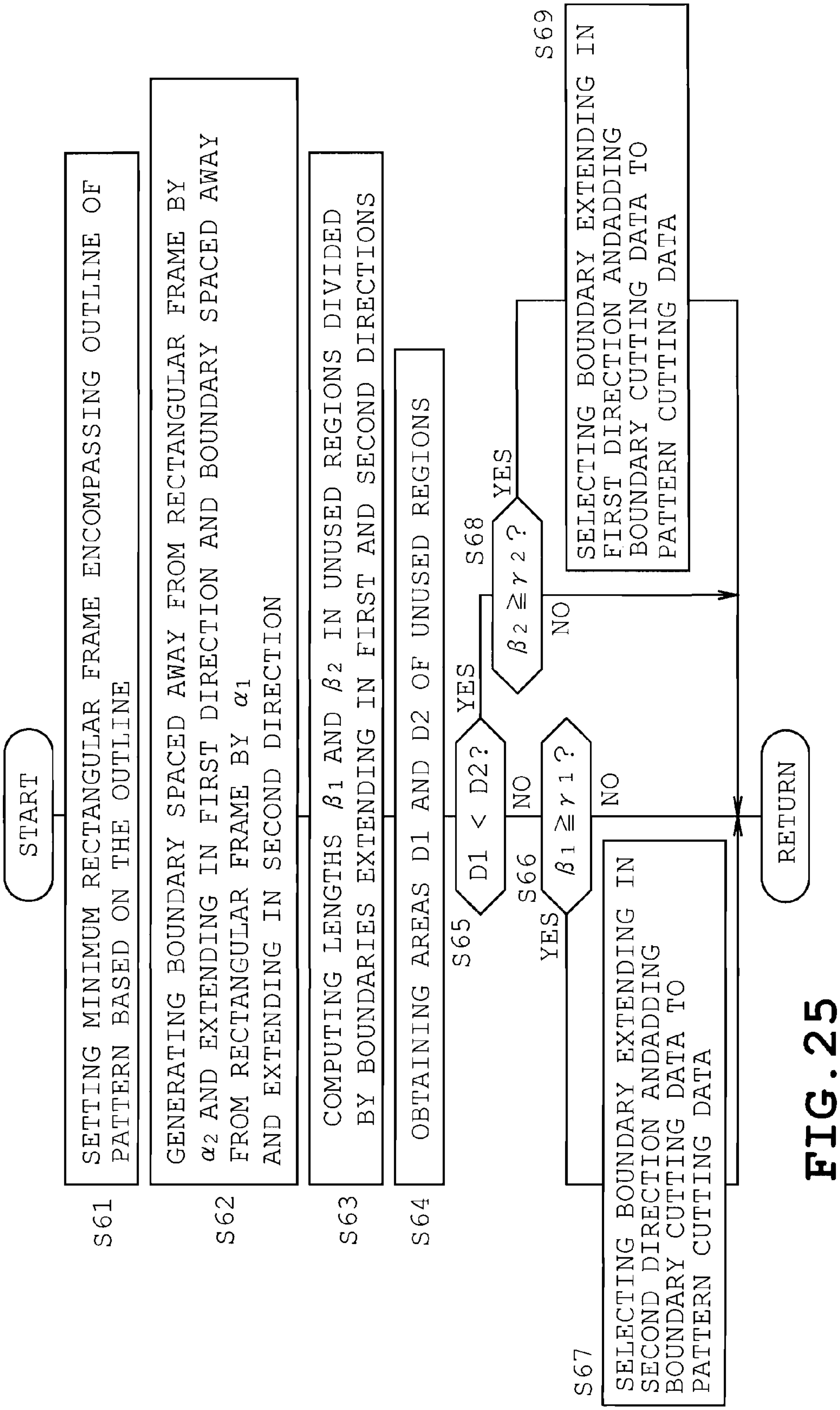
FIG. 25 is a flowchart showing the processing flow in the case where cutting data of a selectively set boundary.

FIGS. 24 and 25 illustrate a third embodiment. Only the difference between the second and third embodiments will be described. Identical or similar parts in the third embodiment are labeled by the same reference symbols as those in the second embodiment.

In the third embodiment, when the pattern A is cut out of the object 6 as shown in FIG. 24, the sizes of the unused regions are compared with each other between a case where the used region and the unused region are divided by a boundary L131 extending in the first or Y direction and a case where the used region and the unused region are divided by a boundary L132 extending in the second or X direction. As a result, the boundary which divides so that the unused region is increased is selected and set. The size of the unused region is represented as an area thereof in the third embodiment.

The external memory 64 in the third embodiment stores minimum reference values $\gamma_1$ and $\gamma_2$ (see FIGS. 24 and 25) which serve as references for determination regarding suitability of setting of the boundaries L131 and L132 in the cut-allowable region represented by the region data as well as the aforementioned region data inclusive of a length Lx in the first direction of the entire object 6 and a length Ly (see FIG. 24). The minimum reference values $\gamma_1$ and $\gamma_2$ are lengths in the first and second directions ($\gamma_1=\gamma_2$, for example) which are set according to the cut-allowable region or the sizes of outlines of the patterns.

FIG. 25 is a flowchart showing the processing contents executed instead of steps S51 to S53 in the boundary cutting data generating processing. A case where the pattern A has been selected at step S44 will be described in the third embodiment. In this case, since the pattern A is arranged with the origin being set at $O_1$ based on the coordinate data of the pattern A and region data, the pattern A is shifted in the first and second directions relative to the origin $O_1$. An outline of the pattern A is extracted and the minimum rectangular frame F130 encompassing the outline is set on the basis of X-Y coordinate of the extracted outline, at step S61 in FIG. 25. A boundary L132 extending in the second direction is generated at a position (a downside position in FIG. 24) spaced away from a line segment L13 of the rectangular frame F130 by an offset amount $\alpha_1$ at step S62. Furthermore, a boundary L131 extending in the first direction is generated at a position spaced away rightward from a line segment L12 of the rectangular frame F130 by an offset amount $\alpha_2$. Although the offset amounts $\alpha_1$ and $\alpha_2$ are equal to each other in the third embodiment, they may take the different values.

The control circuit 61 computes a length $\beta_1$ in the first direction in an unused region divided by the boundary L132 extending in the second direction and a length $\beta_2$ in the second direction in an unused region divided by the boundary L131 extending in the first direction (step S63). More specifically, the region data indicative of the cut-allowable region includes coordinate data corresponding to X and Y dimensions of the object 6. Accordingly, the lengths $\beta_1$ and $\beta_2$ in the first and second directions are obtained on the basis of the coordinate data and region data of boundaries L132 and L131.

The control circuit 61 then computes an area D2 ($=\beta_2\times L_y$) of the unused region divided by the boundary L131 extending in the first direction and an area D1 ($=\beta_1\times L_x$) of the unused region divided by the boundary L132 extending the second direction (step S64). The control circuit 61 compares the areas D1 and D2. When the area D1 is larger than the area D2 (NO at step S65), the control circuit 61 determines whether or not the length $\beta_1$ is equal to or larger than the minimum reference value $\gamma_1$ (step S66). When the length $\beta_1$ is equal to or larger than the minimum reference value $\gamma_1$ (YES at step S66), the control circuit 61 selects and sets the boundary L132. Based on coordinate data of both ends of the boundary L132, the control circuit 61 then generates boundary cutting data including the left end of the boundary L132 serving as the cutting start point $P_0$ and the right end of the boundary L132 serving as the cutting end point $P_1$. The control circuit 61 writes the generated boundary cutting data into the memory of the RAM 63 so that the generated boundary cutting data is added to the pattern cutting data of pattern A (step S67), returning to step S46 in FIG. 22. On the other hand, when the length $\beta_1$ is smaller than the minimum reference value $\gamma_1$ (NO at step S66), the control circuit 61 returns to step S46 without setting the boundary L132. More specifically, when the length $\beta_1$ is smaller than the minimum reference value $\gamma_1$, the control circuits 61 determines that the unused region is too small to use for subsequent cutting, generating no boundary cutting data.

When determining at step S25 that area D2 ($=\beta_2\times L_y$) is larger (YES), the control circuit 61 determines whether or not the length $\beta_2$ is equal to or larger than the minimum reference $\gamma_2$ (step S68). When the length $\beta_2$ is equal to or larger than the minimum reference $\gamma_2$ (YES at step S68), the control circuit 61 selects and sets the boundary L131 extending in the first direction. Based on coordinate data of both ends of the boundary L131, the control circuit 61 generates boundary cutting data including the upper end of the boundary L131 serving as the cutting start point $P_0$ and the lower end of the boundary L131 serving as the cutting end point $P_1$. The control circuit 61 writes the generated boundary cutting data into the memory of the RAM 63 so that the generated boundary cutting data is added to the pattern cutting data of pattern A (step S69), returning to step S46 in FIG. 22. On the other hand, when the length $\beta_2$ is smaller than the minimum reference value 72 (NO at step S68), the control circuit 61 returns to step S46 without setting the boundary L131. More specifically, when the length $\beta_2$ is smaller than the minimum reference value $\gamma_2$, too, the control circuit 61 determines that the unused region is too small to use for subsequent cutting, generating no boundary cutting data.

As described above, the control circuit 61 compares the area of the unused region divided by the boundary L131 extending in the first direction and the area of the unused region divided by the boundary L132 extending in the second direction, thereby selecting and setting the boundary in the case where the division is carried out so that the area of the unused region is rendered larger. According to this configuration, either boundary L131 or 132 that renders the area of the unused region larger is selected. Consequently, the waste of the object 6 can be reduced according to actual cutting conditions such as the shape of pattern A and dimensions of the object 6. Alternatively, the lengths $\beta_1$ and $\beta_2$ extending in the respective first and second directions may be compared, whereby the longer one may be selected for the setting of the boundary, instead of comparison of the areas of unused regions.

Furthermore, since the pattern A is arranged so as to be shifted to the corner of the cut-allowable region, the waste of the object 6 can further be reduced, whereupon the yield of the patterns can be improved.

The control circuit 61 determines the suitability of the setting of the boundaries L131 and L132, based on the previously stored minimum reference values $\gamma_1$ and $\gamma_2$. Consequently, when the remaining space as the result of division by the boundaries L131 and L132 is too small for use as the unused region, a wasted cutting of the boundary can be avoided such that the control manner can be rendered suitable for practical use.

Fourth Embodiment

Figure 26A:
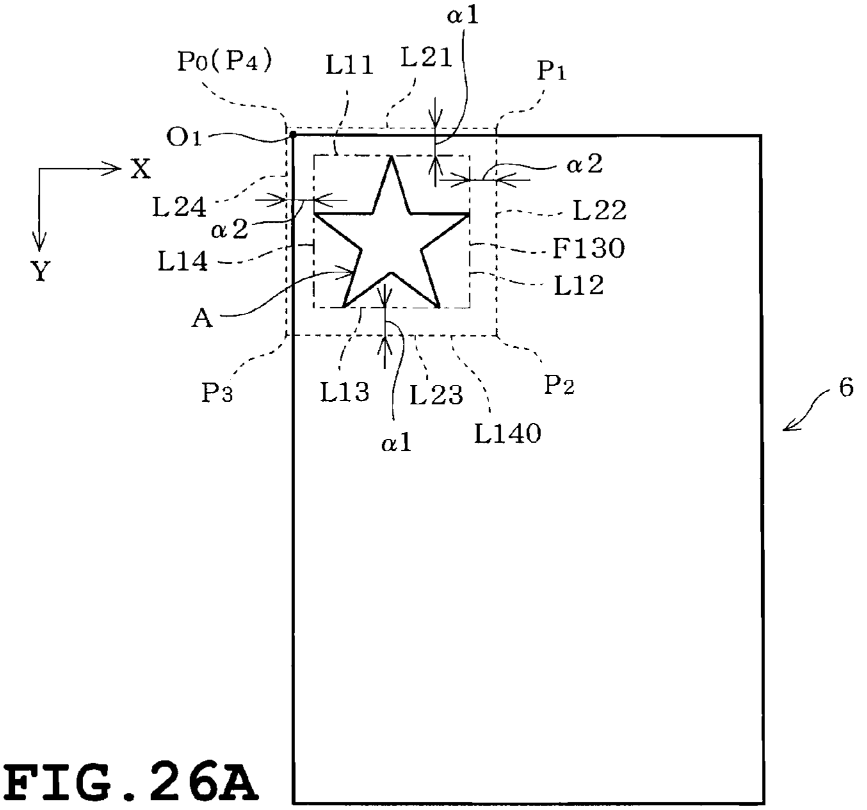
FIGS. 26A and 26B illustrate cutting data of a boundary encompassing a rectangular frame in a fourth embodiment.
Figure 26B:
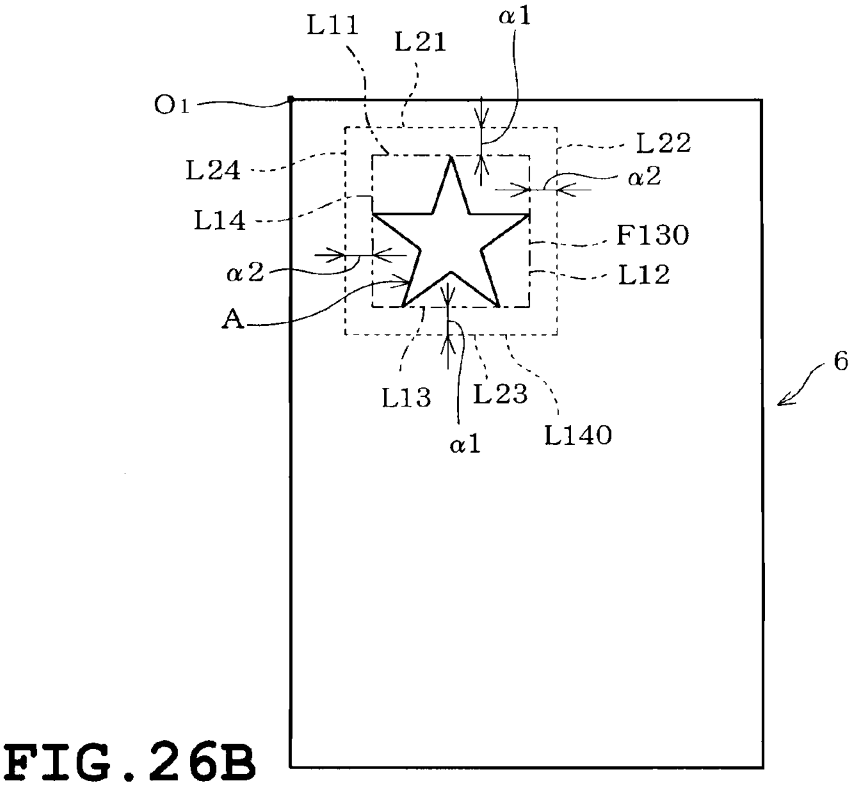
Figure 27:
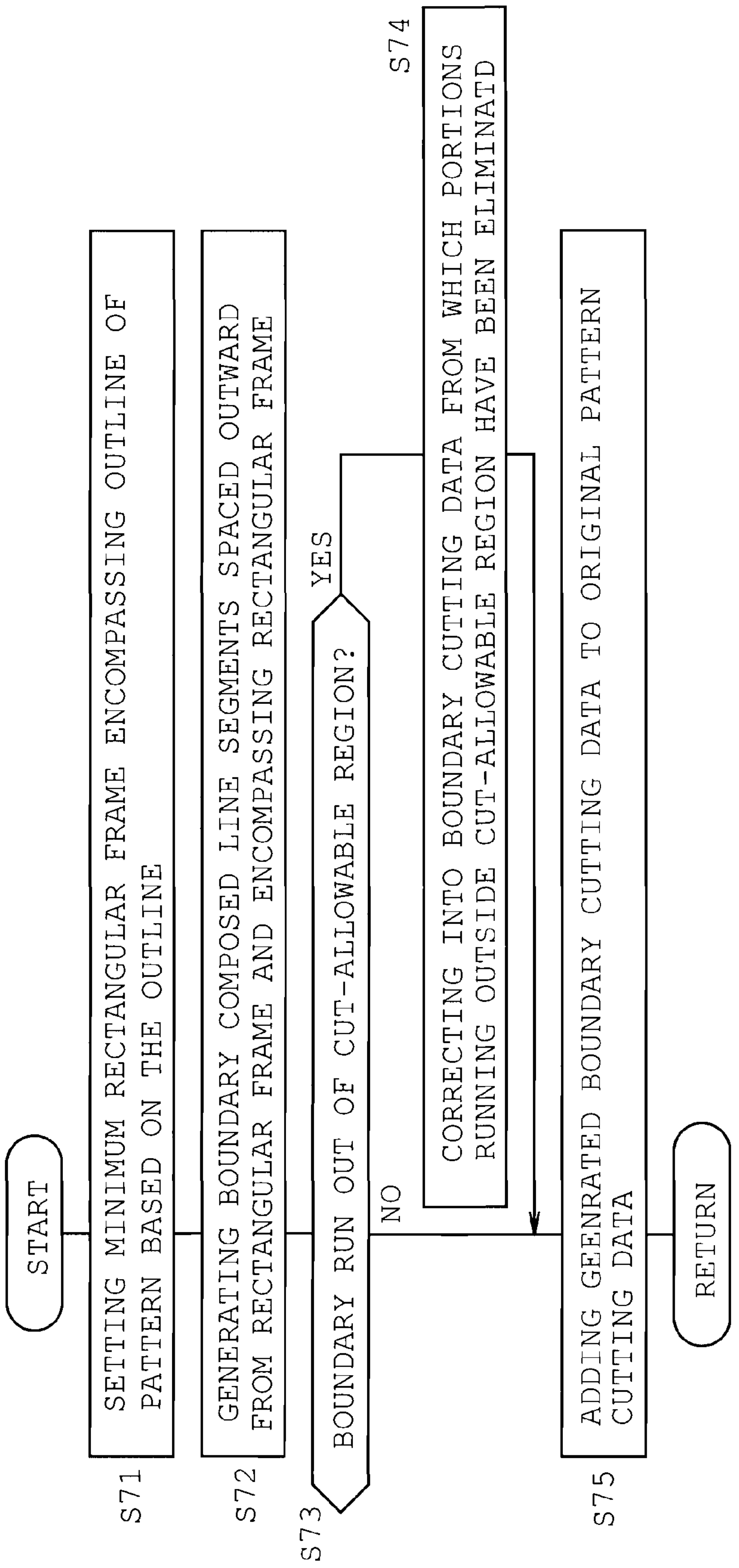
FIG. 27 is a flowchart showing the processing flow in the case where cutting data of a boundary encompassing the rectangular frame.

FIGS. 26A to 27 illustrate a fourth embodiment. Only the difference between the second and fourth embodiments will be described. Identical or similar parts in the fourth embodiment are labeled by the same reference symbols as those in the second embodiment.

A boundary L140 of the pattern A has line segments L21 to L24 which extend in the first and second directions thereby to be perpendicular to one another, so that the boundary L140 is formed into a rectangular shape encompassing the rectangular frame F130, as shown in FIG. 26B. More specifically, the boundary L140 includes line segments L21 and L23 which are outwardly spaced away from line segments L11 and L13 of the rectangular frame L130 in the first direction by an offset amount $\alpha_1$. The boundary L140 also includes line segments L22 and L24 which are outwardly spaced away from line segments L12 and L14 of the rectangular frame 130 in the second direction by an offset amount $\alpha_2$. As a result, a region is formed at a corner in the vicinity of the origin $O_1$ of the cut-allowable region and used in order that an unnecessary portion may be cut out of the object 6 in a rectangular shape.

On the other hand, there is a possibility that a part of the boundary L140 may run outside the cut-allowable region depending upon the arrangement of the pattern A in the cut-allowable region, as shown in FIG. 26A. In view of the problem, the fourth embodiment provides a processing manner to correct data so that the cutter 4 is prevented from being moved outside the cut-allowable region. FIG. 27 is a flowchart showing the processing contents executed instead of steps S51 to S53 in the boundary cutting data generating processing. A case will be described where the pattern A has been selected and arranged at the position as shown in FIG. 26A or 26B, at step S44.

The control circuit 61 extracts an outline of pattern A and sets a minimum rectangular frame F130 encompassing the outline based on X-Y coordinate of the extracted outline, at step S71 in FIG. 27. The control circuit 61 proceeds to step S72 to generate a boundary L140 including line segments L21 and L23 spaced outward from the respective line segments L11 and L13 of the rectangular frame F130 by the offset amount $\alpha_1$ and line segments L22 and L24 spaced outward from the respective line segments L12 and L14 of the rectangular frame F130 by the offset amount $\alpha_2$. The line segments L11 and L13 are perpendicular to the line segments L22 and L24 respectively. The control circuit 61 then generates boundary cutting data based on coordinate data of apexes $P_0$ to $P_3$ of the boundary L140. The apex $P_0$ serves as a cutting start point and a cutting end point $P_4$.

The control circuit 61 then determines whether or not the boundary L140 has run out of the cut-allowable region (step S73). Since the boundary L140 shown in FIG. 26B is within the cut-allowable region (NO at step S73), the cutting data is not corrected. On the other hand, the boundary L140 shown in FIG. 26A includes left and upper line segments L21 and L24 both located outside the cut-allowable region and parts of other line segments L22 and L23 both located outside the cut-allowable region (YES at step S73). The control circuit 61 executes the processing to correct the cutting data of the boundary L140 so that the portions having run outside the cut-allowable region are deleted (step S74). As a result of the processing, the left and upper line segments, an upper part of the line segment L22 and a left part of the line segment L23 are eliminated, whereby the cutting data of the boundary L140 is corrected into data of an inverted L-shaped boundary composed of the remaining line segments L22 and L23. The control circuit 61 writes the corrected boundary cutting data into the memory of RAM 63 so that the corrected boundary cutting data is added to the pattern cutting data of pattern A (step S75), returning to step S46. The cutting data of boundary L140 shown in FIG. 26B is written into the memory of RAM 63 without correction.

The control circuit 61 sets the boundary L140 including the line segments L21 to L24 which extend in the first and second directions and are perpendicular to one another. The used region and the unused region are divided by the line segments L21 to L24 perpendicular to one another. Consequently, the unused region can remain as much as possible and the waste of the object 6 can be reduced as compared with the case where the boundary is divided only in the first or second direction.

Furthermore, when the set boundary L140 runs outside the cut-allowable region, the control circuit 61 generates the boundary cutting data from which the portion outside the cut-allowable region (see FIG. 26A) has been eliminated. Consequently, the cutter 4 can be prevented from being moved to the region having no object 6 while the cutter holder 5 occupies the lowered position during the cutting. This results in reduction in the wasted operation of the cutting apparatus 1, shortening the cutting time.

Fifth Embodiment

Figure 28:
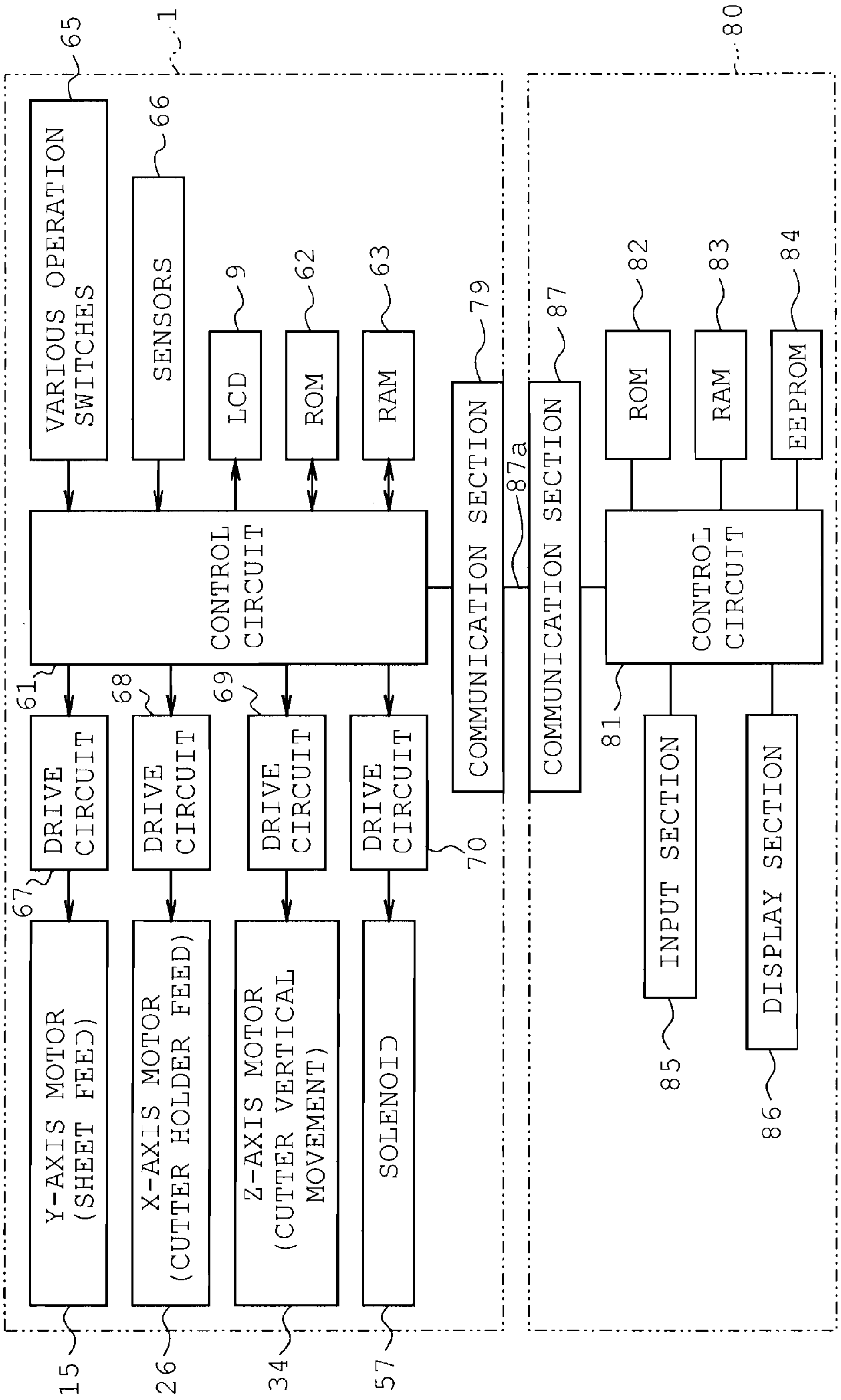
FIG. 28 is a view similar to FIG. 10, showing a sixth embodiment.

FIG. 28 illustrates a fifth embodiment. Only the difference between the foregoing first to fourth embodiments and fifth embodiment will be described. Identical or similar parts in the fifth embodiment are labeled by the same reference symbols as those in the foregoing embodiments.

A personal computer 80 (PC 80) as shown in FIG. 12 is configured as a cutting data processing device for processing the cutting data. More specifically, the PC 80 includes a control circuit 81 mainly constituted by a computer (CPU). A ROM 82, a RAM 83 and EEPROM 84 are connected to the PC 80. To the PC 80 is further connected an input section 85, such as a keyboard and a mouse, which is operated by the user in order that various instructions and selection may be entered and other input operations may be performed. A display section 86 (LCD, for example) is connected to the PC 80 to display messages or the like necessary for the user.

The PC 80 is provided with a communication section 87 which connects the PC 80 by wire to the cutting apparatus 1. The cutting apparatus 1 is provided with a communication section 79. As a result, data including the foregoing pattern cutting data, frame cutting data and boundary cutting data is communicated between the PC 80 and the cutting apparatus 1. However, wireless communication may be provided between the PC 80 and the cutting apparatus 1, instead. The control circuit 81 (control unit) controls the entire control and executes the cutting data processing program and the like. The ROM 82 stores the cutting data processing program and the like. The RAM 83 temporarily stores data and programs necessary for various processing and has memory areas to store the frame cutting data, the boundary cutting data and the like. The EEPROM 84 stores various pattern cutting data (including full coverage data).

The control circuit 81 reads the pattern cutting data from the EEPROM 84 and executes processing of the cutting data processing program, that is, the processing as shown by the flowcharts of FIGS. 13, 14, 16, 18, 22, 23, 26 and 27. In the cutting data generating processing, the control circuit 81 generates outer line cutting data such as frame cutting data or boundary cutting data according to pattern cutting data in the same manner as described in the foregoing embodiments. The generated outer line cutting data is added to the pattern cutting data to be overwritten on the EEPROM 84. In the cutting data generating processing, various outer lines such as the boundary extending in a single direction or rectangular or L-shaped boundary can be generated (see FIGS. 24 to 27). The cutting apparatus 1 cuts the object 6 according to pattern cutting data and outer line cutting data both transmitted from the PC 80.

As understood from the foregoing, the control circuit 81 is configured to serve as the arranging unit, the extraction unit, the frame setting unit, the frame expanding unit, the boundary determining unit and the cutting data generating unit. Accordingly, the fifth embodiment can achieve the same effects as each of the first to fourth embodiments, for example, the unnecessary region in the pattern cutting can be set at a requisite minimum according to the outline of the pattern.

The embodiments described above with reference to the drawings should not be restrictive but may be modified or expanded as follows. Although the cutting apparatus 1 is applied to the cutting plotter in each embodiment, the cutting plotter 1 may be applied to various devices and apparatuses each having a cutting function.

Figure 29:
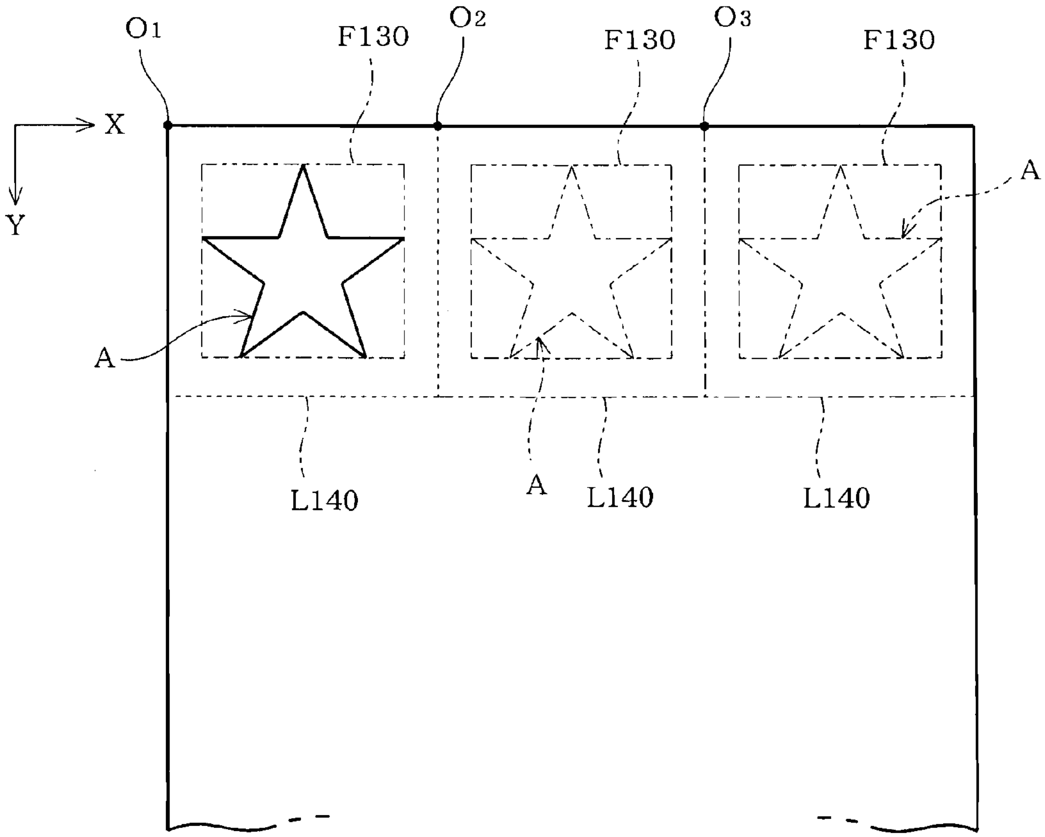
FIG. 29 illustrates the processing of sequentially shifting the origin in the X direction from an initial position every time of completion of the cutting.

In the second embodiment, the RAM 63 stores, as data relating to the origin, position information in which the origin is shifted from the initial position $O_1$ sequentially to $O_2$ and $O_3$ in the Y direction every time the cutting operation ends. The control manner should not be limited to the foregoing. More specifically, the boundary L140 shown by broken line in FIG. 29 is set as the inverted L-shape as in the fourth embodiment and cut together with the pattern A. Thereafter, the RAM 63 stores position information in which the origin is shifted from the initial position $O_1$ sequentially to $O_2$ and $O_3$ in the Y direction every time the cutting operation ends. Accordingly, the user can consecutively cut patterns using an unused region of the object 6 without instructing "paper ejection" after end of cutting.

The cutting apparatus 1 has a function as the cutting data processing device as described above. The cutting data processing program stored in a storage unit of the cutting apparatus or PC 80 may be stored in a computer-readable storage medium such as a USB memory, CD-ROM, flexible disc, DVD or flash memory. In this case, data stored in the storage medium is read into computers of various data processing devices and executed. This configuration can achieve the same operation and advantageous effects as described above.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A cutting apparatus in which a cutting blade and an object to be cut are moved relative to each other so that a desired pattern is cut out of the object, the cutting apparatus comprising:

an arranging unit which arranges the pattern in a cut-allowable region of the object;

a frame setting unit which sets a minimum boundary frame which is polygonal or curved in shape and includes an outline of the pattern arranged by the arranging unit; and a cutting data generating unit which generates outer line cutting data for cutting an outer line dividing a first region near the pattern within the cut-allowable region and a second region other than the first region, outside the boundary frame, based on the boundary frame, wherein the pattern and the outer line are cut out of the object based on pattern cutting data for cutting the pattern and the outer line cutting data.

2. The apparatus according to claim 1, further comprising an extracting unit which extracts the outline of the pattern based on the pattern cutting data and a frame enlarging unit which enlarges the boundary frame set by the frame setting unit so that the boundary frame is spaced outward therefrom by a predetermined distance, wherein:

the frame setting unit sets the boundary frame including the outline based on the outline extracted by the extracting unit;

the cutting data generating unit generates frame cutting data in which the enlarged frame enlarged by the frame enlarging unit serves as the outer line; and the pattern and the enlarged frame are cut based on the pattern cutting data and the frame cutting data.

3. The apparatus according to claim 2, wherein:

the pattern is a pattern group including a plurality of patterns;

the extracting unit extracts the outline for every one pattern of the pattern group;

the frame setting unit sets a minimum boundary frame which is polygonal or curved in shape and includes all the outlines extracted by the extracting unit; and the frame enlarging unit enlarges the boundary frame set by the frame setting unit.

4. The apparatus according to claim 2, wherein:

the pattern is a pattern group including a plurality of patterns;

the extracting unit extracts the outline for every one pattern of the pattern group;

the frame setting unit sets the boundary frame for every outline extracted by the extracting unit;

the frame enlarging unit enlarges the boundary frame for every outline, set by the frame setting unit; and the cutting data generating unit generates frame cutting data for a part except for an overlapped part when the enlarged frames enlarged by the frame enlarging unit overlap.

5. The apparatus according to claim 2, wherein:

the pattern is a pattern group including a plurality of patterns;

the extracting unit extracts the outline for every one pattern of the pattern group;

the frame setting unit sets a boundary frame corresponding with every one of the outlines extracted by the extracting unit;

the frame enlarging unit enlarges the boundary frame set by the frame setting unit so that the boundary frame is spaced outward from the outline by a predetermined distance; and the cutting data generating unit generates frame cutting data for a part except for an overlapped part when the enlarged frames enlarged by the frame enlarging unit overlap.

6. The apparatus according to claim 1, wherein a rectangular frame is set as the boundary frame in the cut-allowable region by the frame setting unit, the apparatus further comprising a boundary determining unit which determines a boundary dividing the cut-allowable region into a used region at the rectangular frame side and an unused region other than the used region, based on the rectangular frame, wherein:

the cutting data generating unit generates boundary cutting data in which the boundary determined by the boundary determining unit serves as the outer line; and the pattern and the boundary are cutout of the object, based on the pattern cutting data and the boundary cutting data.

7. The apparatus according to claim 6, further comprising a storage unit which stores position information about the unused region in the object, wherein the arranging unit which arranges the pattern in the unused region based on the position information stored in the storage unit, in cutting of subsequent pattern cutting.

8. The apparatus according to claim 6, further comprising a first moving unit which moves the object in a first direction and a second moving unit which moves the cutting blade in a second direction perpendicular to the first direction, wherein:

the object and the cutting blade are moved in the first and second directions relative to each other; and the arranging unit arranges the pattern so that the pattern is drawn to one side in the first direction in the cut-allowable region, and the boundary determining unit sets the boundary so that the boundary extends in the second direction thereby to divide the used region and the unused region; or the arranging unit arranges the pattern so that the pattern is drawn to one side in the second direction in the cut-allowable region, and the boundary determining unit sets the boundary so that the boundary extends in the first direction thereby to divide the used region and the unused region.

9. The apparatus according to claim 6, further comprising a first moving unit which moves the object in a first direction and a second moving unit which moves the cutting blade in a second direction perpendicular to the first direction, wherein:

the object and the cutting blade are moved in the first and second directions relative to each other;

the arranging unit arranges the pattern so that the pattern is drawn to a corner of the cut-allowable region; and the boundary determining unit compares sizes of the unused regions between a case where the used and unused regions are divided by a boundary extending in the first direction and a case where the used and unused regions are divided by a boundary extending in the second direction, thereby selecting and setting the boundary in either case where the unused region is larger as a result of division.

10. The apparatus according to claim 6, further comprising a first moving unit which moves the object in a first direction and a second moving unit which moves the cutting blade in a second direction perpendicular to the first direction, wherein:

the object and the cutting blade are moved in the first and second directions relative to each other;

the arranging unit arranges the pattern so that the pattern is drawn to a corner of the cut-allowable region; and the boundary determining unit sets the boundary as line segments extending in the first and second directions to be perpendicular to each other, thereby dividing the used and unused regions by the perpendicular line segments.

11. A cutting data processing device which processes cutting data for a cutting apparatus which moves a cutting blade and an object to be cut relative to each other thereby to cut a desired pattern out of the object, the device comprising:

an arranging unit which arranges the pattern in a cut-allowable region of the object;

a frame setting unit which sets a minimum boundary frame which is polygonal or curved and includes a contour of the pattern arranged by the arranging unit; and a cutting data generating unit which generates outer line cutting data for cutting an outer line dividing a first region near the pattern within the cut-allowable region and a second region other than the first region, outside the boundary frame, based on the boundary frame, wherein the pattern and the outer line are cut out of the object based on pattern cutting data for cutting the pattern and the outer line cutting data.

12. The device according to claim 11, further comprising an extracting unit which extracts an outline of the pattern based on the pattern cutting data and a frame enlarging unit which enlarges the boundary frame set by the frame setting unit so that the boundary frame is spaced outward therefrom by a predetermined distance, wherein:

the frame setting unit sets the boundary frame including the outline based on the outline extracted by the extracting unit; and the cutting data generating unit generates frame cutting data in which the enlarged frame enlarged by the frame enlarging unit serves as the outer line.

13. The device according to claim 12, wherein:

the pattern is a pattern group including a plurality of patterns;

the extracting unit extracts the outline for every one pattern of the pattern group;

the frame setting unit sets a minimum boundary frame which is polygonal or curved in shape and includes all the outlines extracted by the extracting unit; and the frame enlarging unit enlarges the boundary frame set by the frame setting unit.

14. The device according to claim 12, wherein:

the pattern is a pattern group including a plurality of patterns;

the extracting unit extracts the outline for every one pattern of the pattern group;

the frame setting unit sets the boundary frame for every outline extracted by the extracting unit;

the frame enlarging unit enlarges the boundary frame for every outline, set by the frame setting unit; and the cutting data generating unit generates frame cutting data for apart except for an overlapping part when the enlarged frames enlarged by the frame enlarging unit overlap.

15. The device according to claim 12, wherein:

the pattern is a pattern group including a plurality of patterns;

the extracting unit extracts the outline for every one pattern of the pattern group;

the frame setting unit sets a boundary frame corresponding with every one of the outlines extracted by the extracting unit;

the frame enlarging unit enlarges the boundary frame set by the frame setting unit so that the boundary frame is spaced outward from the outline by a predetermined distance; and the cutting data generating unit generates frame cutting data for a part except for an overlapping part when the enlarged frames enlarged by the frame enlarging unit overlap.

16. The device according to claim 11, wherein a rectangular frame is set as the boundary frame in the cut-allowable region by the frame setting unit, the apparatus further comprising a boundary determining unit which determines a boundary dividing the cut-allowable region into a used region at the rectangular frame side and an unused region other than the used region, based on the rectangular frame, wherein:

the cutting data generating unit generates boundary cutting data in which the boundary determined by the boundary determining unit serves as the outer line; and the pattern and the boundary are cut out of the object, based on the pattern cutting data and the boundary cutting data.

17. The device according to claim 16, wherein:

the arranging unit arranges the pattern so that the pattern is drawn to one side in the first direction in the cut-allowable region;

the boundary determining unit sets the boundary so that the boundary extends in the second direction thereby to divide the used region and the unused region;

the boundary determining unit sets the boundary in the cut-allowable region so that the boundary extends in the second direction in which the cutting blade is moved by the cutting apparatus and which is perpendicular to the first direction, thereby dividing the used and unused regions; and/or the arranging unit arranges the pattern so that the pattern is drawn to one side in the second direction in the cut-allowable region; and the boundary determining unit sets the boundary in the cut-allowable region so that the boundary extends in a first direction in which the object is moved by the cutting apparatus and which is perpendicular to the second direction, thereby dividing the used and unused regions.

18. The device according to claim 16, wherein:

the arranging unit arranges the pattern so that the pattern is drawn to a corner of the cut-allowable region; and the boundary determining unit compares sizes of the unused regions between a case where the used and unused regions are divided by a boundary extending in the first direction and a case where the used and unused regions are divided by a boundary extending in the second direction, thereby selecting and setting the boundary in either case where the unused region is larger as a result of division.

19. The device according to claim 16, wherein:

the arranging unit arranges the pattern so that the pattern is drawn to one side in the second direction in the cut-allowable region; and the boundary determining unit sets the boundary in the cut-allowable region as line segments extending in the first and second directions to be perpendicular to each other, thereby dividing the used and unused regions by the perpendicular line segments.

20. A storage medium which is computer-readable and stores a program that is used for a cutting apparatus which cuts a desired pattern out of an object to be cut by moving a cutting blade and the object, the program comprising:

an arranging routine of arranging the pattern in the cut-allowable region of the object;

a frame setting routine of setting a minimum boundary frame which is polygonal or curved in shape and includes all the outlines extracted by the extracting unit; and a cutting data generating routine of generating outer line cutting data for cutting an outer line dividing a first region near the pattern within the cut-allowable region and a second region other than the first region, outside the boundary frame, based on the boundary frame.

* * * * *